(12) United States Patent
Pakhchyan

(10) Patent No.: US 9,606,349 B2
(45) Date of Patent: Mar. 28, 2017

(54) MEMS DISPLAY

(71) Applicant: Edward Pakhchyan, Glendale, CA (US)

(72) Inventor: Edward Pakhchyan, Glendale, CA (US)

(73) Assignee: Edward Pakhchyan, Glendale, CA (US)

(*) Notice: Subject to any disclaimer, the term of this patent is extended or adjusted under 35 U.S.C. 154(b) by 9 days.

(21) Appl. No.: 14/589,434

(22) Filed: Jan. 5, 2015

(65) Prior Publication Data

US 2016/0195710 A1    Jul. 7, 2016

(51) Int. Cl.
*G02B 26/02* (2006.01)
*F21V 8/00* (2006.01)

(52) U.S. Cl.
CPC ............ *G02B 26/02* (2013.01); *G02B 6/0011* (2013.01)

(58) Field of Classification Search
CPC ...... G02B 26/02; G02B 26/023; G02B 6/005; G02B 6/0055; G02B 6/0011; G02B 5/003; G02B 5/0242
USPC .................. 359/227, 230, 233; 345/204, 216
See application file for complete search history.

(56) References Cited

U.S. PATENT DOCUMENTS

| 6,701,039 | B2 | 3/2004 | Bourgeois et al. |
| 7,227,677 | B2 | 6/2007 | Ravnkilde et al. |
| 7,391,552 | B2* | 6/2008 | Barton ................. G02B 6/0043 359/233 |
| 7,405,852 | B2 | 7/2008 | Brosnihan et al. |
| 7,995,261 | B2 | 8/2011 | Pakhchyan et al. |
| 8,817,353 | B2 | 8/2014 | Lee et al. |
| 2014/0327948 | A1* | 11/2014 | Shi .......................... G02B 26/02 359/230 |

* cited by examiner

*Primary Examiner* — James Phan

(57) ABSTRACT

Electromechanical light modulators and backlight providing efficient, low cost and high performance displays.

20 Claims, 18 Drawing Sheets

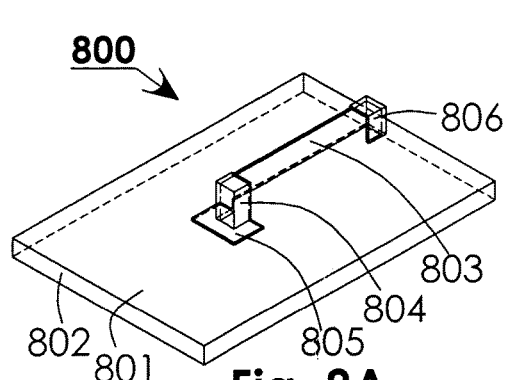
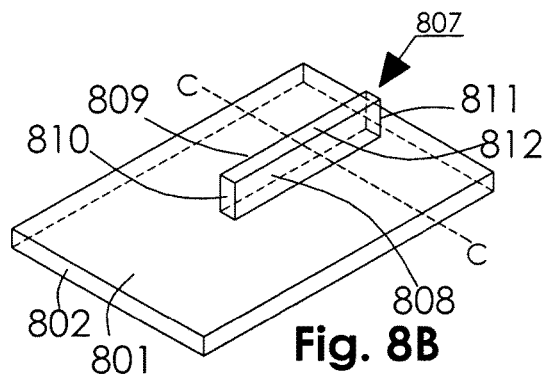
Fig. 8A
Fig. 8B
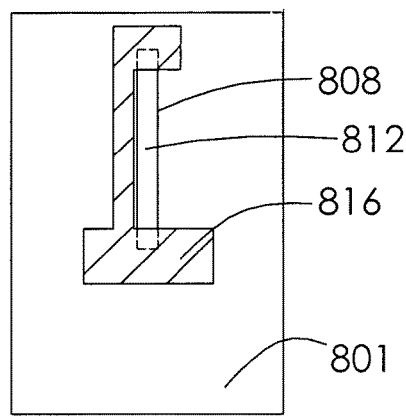
Fig. 8D
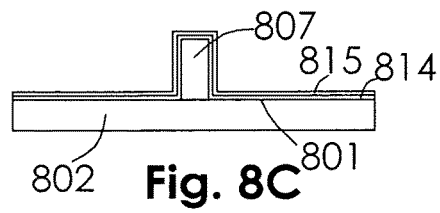
Fig. 8C
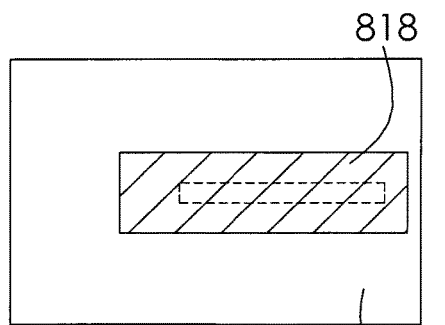
Fig. 8G
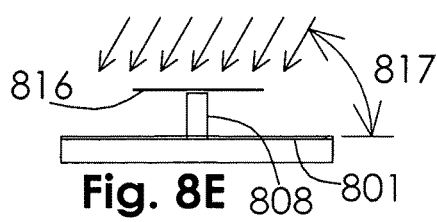
Fig. 8E
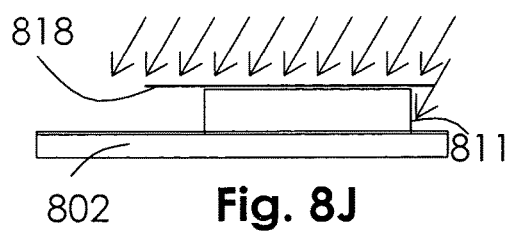
Fig. 8J
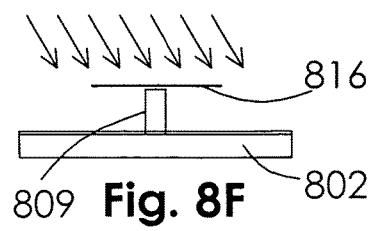
Fig. 8F

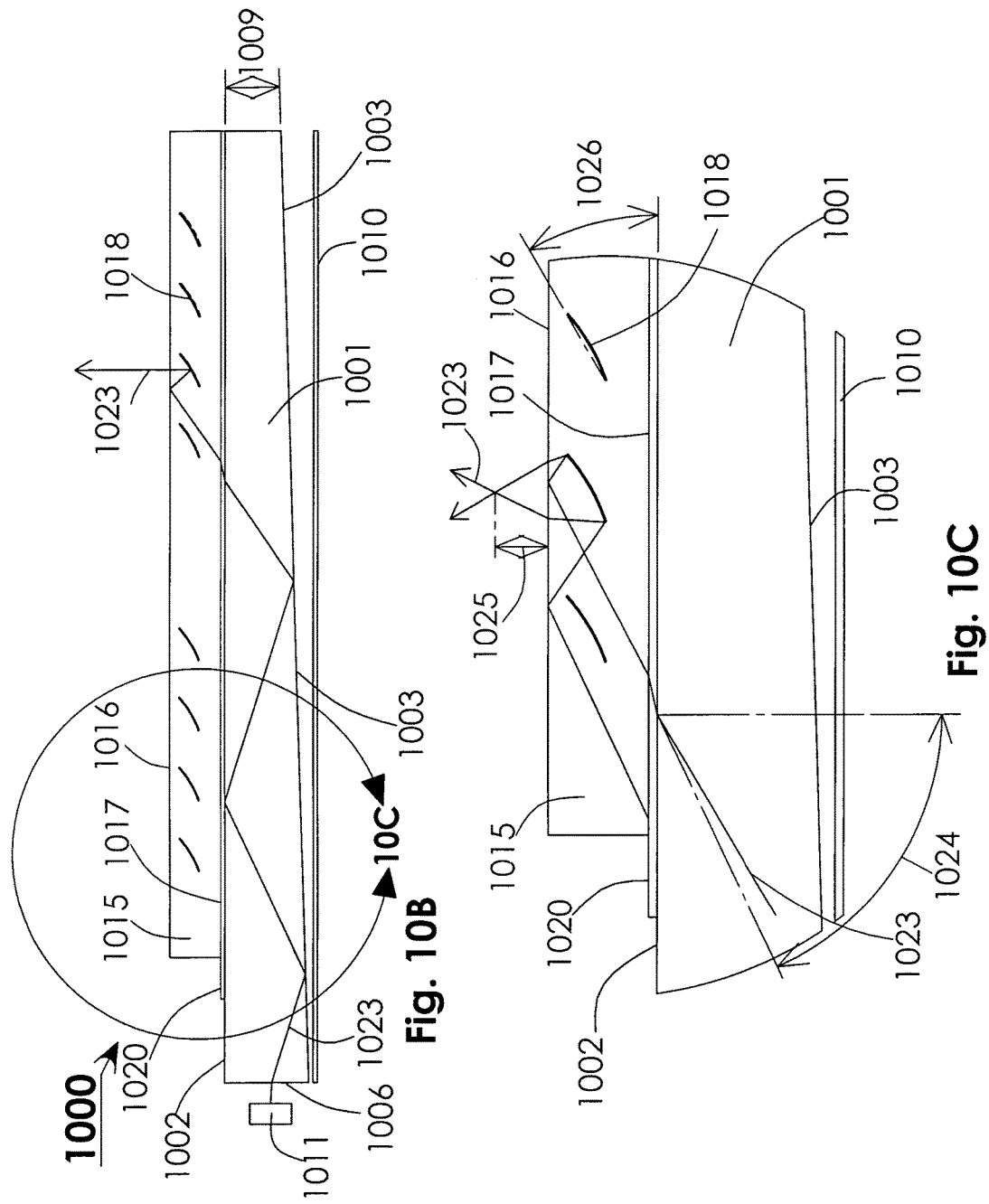

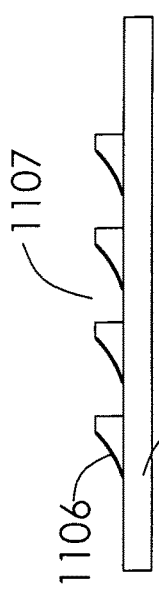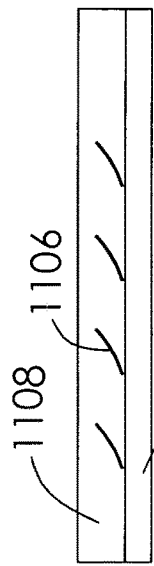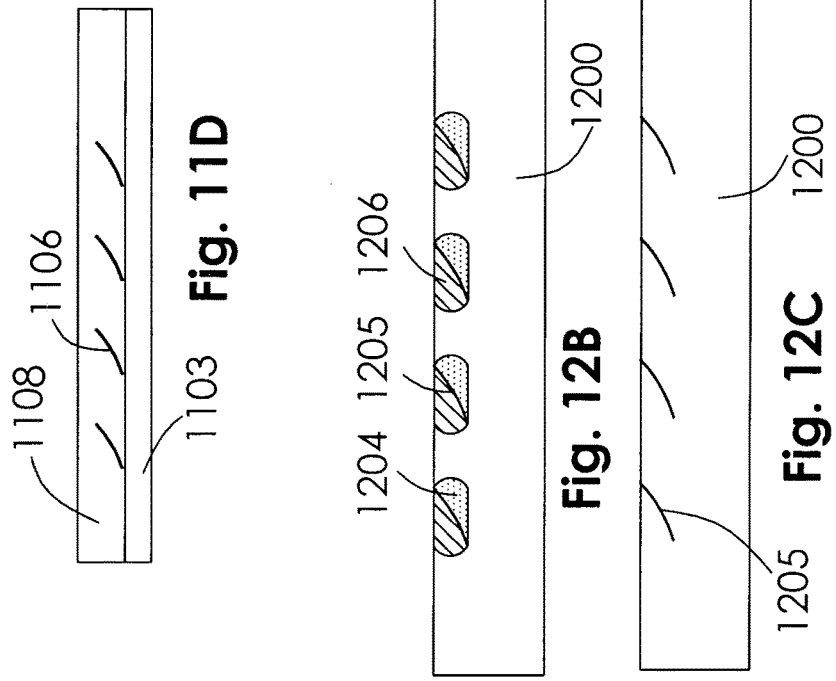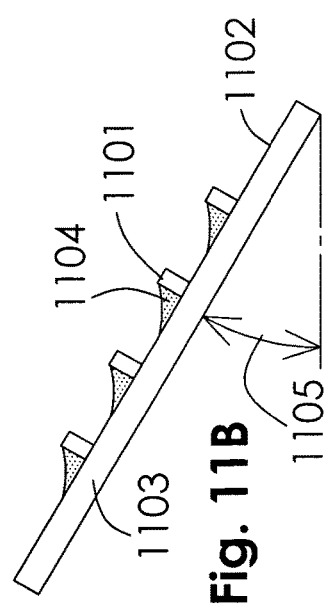

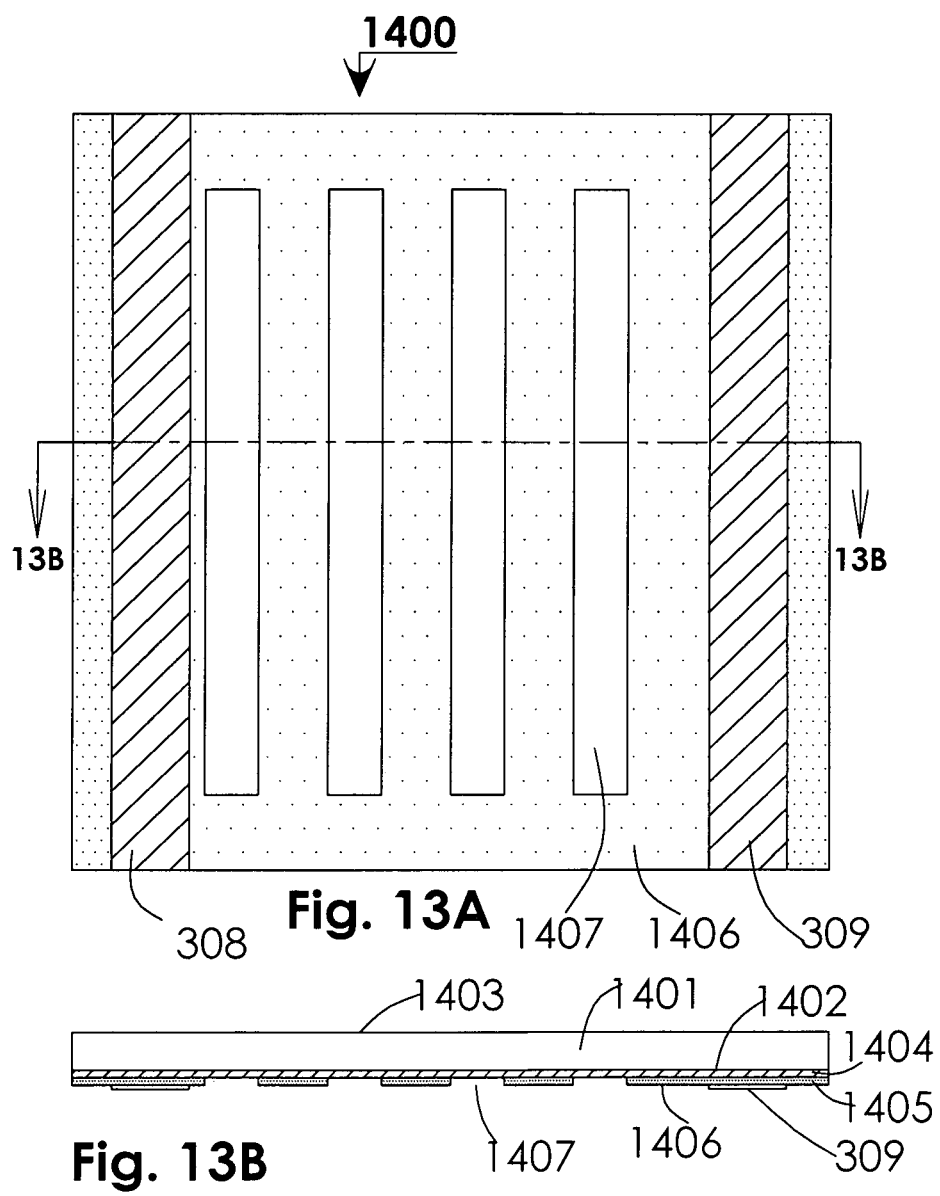

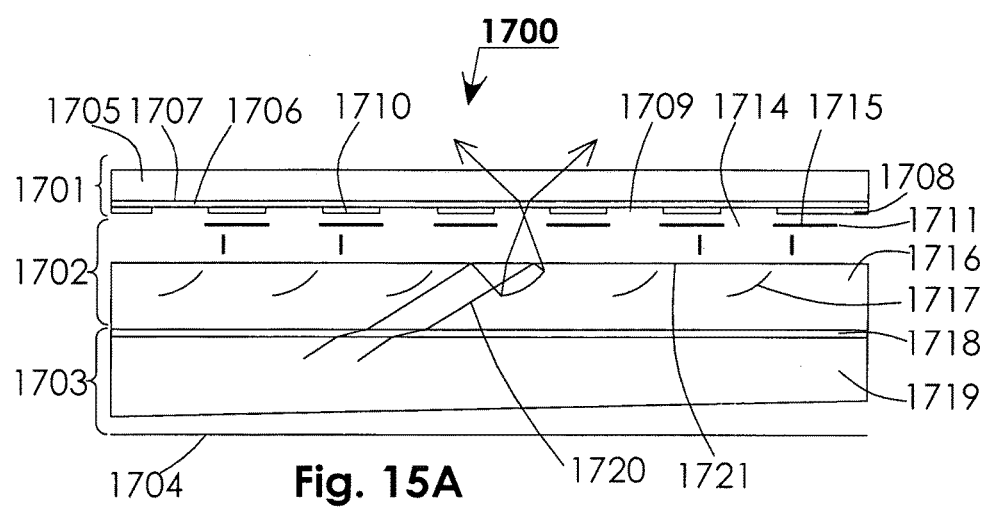
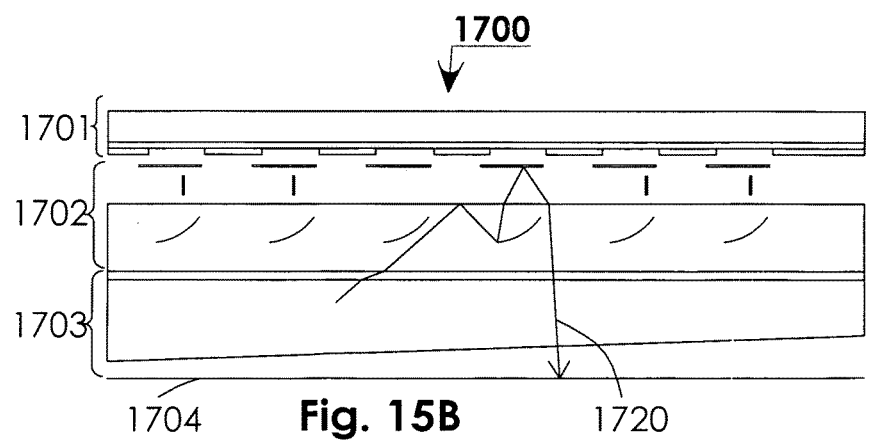

MEMS DISPLAY

RELATED U.S. PATENT DOCUMENTS

U.S. application Ser. No. 12/584,465 filed Sep. 3 2009 now U.S. Pat. No. 7,995,261 B2 which is included here as reference.

BACKGROUND OF THE INVENTION

Field of the Invention

The present inventions relate generally to displays. More particularly, the invention concerns displays comprising electromechanical picture elements.

Discussion of the Prior Art

Currently liquid crystal displays dominate the flat panel display market. Displays based on electromechanical light modulators have been proposed as a viable alternate to LCDs. The present inventions disclose electromechanical light modulators and displays that can compete with LCDs in picture performance, light efficiency and cost.

SUMMARY OF THE INVENTION

The following is a summary description of illustrative embodiments of the invention. It is provided as a preface to assist those skilled in the art to more rapidly understand the detailed design discussions which follow and is not intended in any way to limit the scope of the claims which are appended hereto in order to particularly point out the invention.

The specification discloses several electromechanical light modulators. According to illustrative embodiments of the invention, modulators include one or two electrostatic actuators, a light shutter supported over a surface of a substrate with a plurality of supports that are attached to the shutter at a first and a second end of the shutter. In operation the actuator applies a force to the shutter. The shutter supports limit the shutter movement in the direction of the force and allow the shutter to move substantially in a lateral direction with respect to the force. The shutter moves in the lateral direction between a first and a second position without physical contact with a stationary part or surface. Each electrostatic actuator includes two electrodes that are positioned substantially parallel and close distance from each other. In some embodiments the shutter is conductive and acts as one of the actuator electrodes. In other designs the shutter includes a flange extending from an edge of the shutter at a right angle and forms an electrostatic actuator with a fixed electrode. The fixed electrode may be positioned substantially close to the flange to form an efficient electrostatic actuator.

The shutter supports are located between the shutter and the surface therefore in a display shutters may be positioned substantially close to each other only allowing a space between them for shutter movements. In some modulators the shutter is supported on the surface with cantilever beams. The invention discloses a method of manufacturing cantilever beams and a shutter supported by the cantilever beams. The invention also discloses a display comprising: a light absorbing layer having light transmitting regions, a backlight including a rear reflector for reflecting light towards the light absorbing layer and a plurality of modulators each including a shutter positioned between the backlight and the light absorbing layer, said shutter having light transmitting regions and a light reflecting surface facing the backlight for recycling the light emitted from the backlight, wherein light from the backlight impinging said light transmitting regions of the shutter transmit through the light transmitting regions of the light absorbing layer when the shutter is at a first position and are absorbed in the light absorbing layer when the shutter is at a second position.

The invention also discloses another display comprising: a plurality of modulators each including a shutter having light transmitting regions, and a substrate having a surface and a plurality of embedded light reflectors, wherein said embedded light reflectors cause light to exit the substrate from said surface of the substrate and converge at respective light transmitting regions of the shutter.

The foregoing as well as other objects of the invention are illustrated in the accompanying drawings and described in the specification that follows.

BRIEF DESCRIPTION OF THE DRAWINGS

FIG. 8A is a perspective view of a shutter support according to an illustrative embodiment of the invention.

FIG. 8B is a perspective view of a mold for manufacturing the shutter support shown in FIG. 8A.

FIG. 8C is a sectional view taken along line C-C in FIG. 8B illustrating a step for manufacturing the shutter support shown in FIG. 8A.

FIG. 8D is a top view illustrating a step for manufacturing the shutter support shown in FIG. 8A.

FIG. 8E is a front view illustrating a step for manufacturing the shutter support shown in FIG. 8A.

FIG. 8F is a front view illustrating a step for manufacturing the shutter support shown in FIG. 8A.

FIG. 8G is a top view illustrating a step for manufacturing the shutter support shown in FIG. 8A.

FIG. 8J is a side view illustrating a step for manufacturing the shutter support shown in FIG. 8A.

FIG. 10B is a side view of the display backlight shown in FIG. 10A.

FIG. 10C is an enlarged view of the area designated 10C in FIG. 10B.

FIGS. 11A to 11D are sectional views illustrating steps for manufacturing an optical layer with embedded light reflectors according to an illustrative embodiment of the invention.

FIGS. 12A to 12C are sectional views illustrating steps for manufacturing a substrate with embedded light reflectors according to an illustrative embodiment of the invention.

FIG. 13A is a plan view of a display cover assembly according to an illustrative embodiment of the invention.

FIG. 13B is a sectional view taken along lines 13B in FIG. 13A.

FIG. 15A is a sectional view of a display according to an illustrative embodiment of the invention illustrating a shutter located at a first position.

FIG. 15B is a sectional view of the display shown in FIG. 15A illustrating the shutter located at a second position.

DESCRIPTION OF THE INVENTION

Figure 1A:
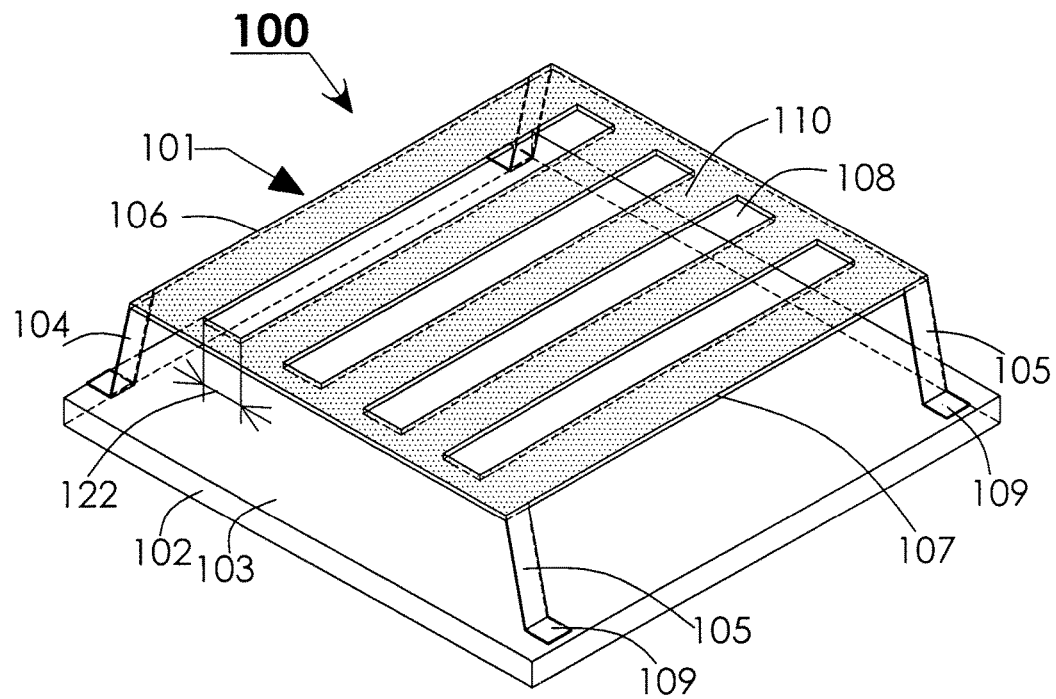
FIG. 1A is a perspective view of a shutter assembly according to an illustrative embodiment of the invention.
Figure 1B:
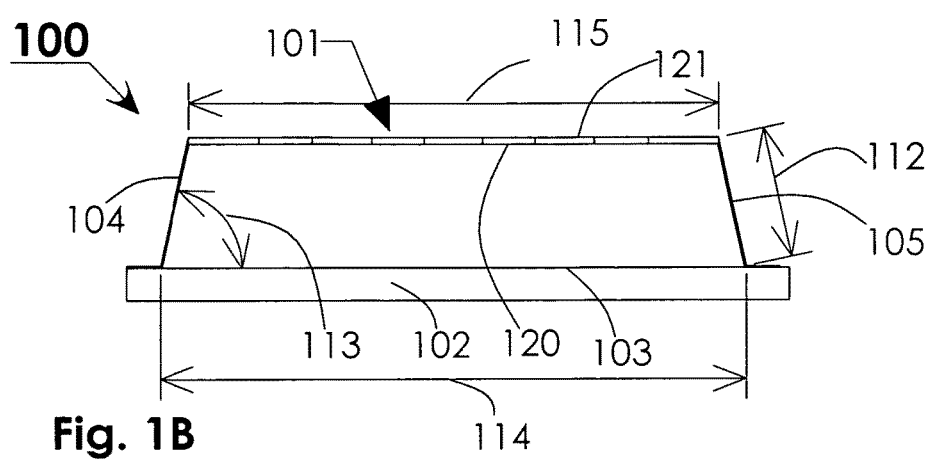
FIG. 1B is a front view of the shutter assembly shown in FIG. 1A.

FIG. 1A is a perspective view and FIG. 1B is a front view of a shutter assembly 100 according to an illustrative embodiment of the invention. The shutter assembly 100 includes a light shutter 101 that is supported over a surface 103 of a transparent substrate 102 with supports 104 and 105. The supports 104 are attached at a first end 106 of the shutter 101 and the supports 105 are attached at a second end 107 of the shutter 101. The supports 104 and 105 are substantially straight and are inclined with respect to each other and with respect to the surface 103 and form an angle 113 with the surface 103 between 70 and 85 degrees. The supports 104 and 105 are attached to the surface 103 of substrate 102 with pads 109 at a distance 114 that is greater than a distance 115 between the attachment points of the supports 104 and 105 on the shutter 101. The shutter assembly 100 may be constructed to have supports 104 and 105 inclined with respect to each other and attached to the surface 103 at a distance 114 that is smaller than the distance 115. The supports 104 and 105 and the pads 109 are constructed from a thin conductive material and provide an electrical connection from the surface 103 to the shutter 101. The shutter 101 also is constructed from a thin conductive material or a multilayer film that includes a conductive layer. The shutter 101 includes light transmitting regions 108 and light obstructing or blocking regions 110. The light blocking regions 110 are larger (wider and longer) than the light transmitting regions 108. The light transmitting regions 108 transmit 90% or more light impinging the light transmitting regions 108 and the light blocking regions 110 blocks at least 99% of the light.

The outer edges or all edges of the shutter 101 are beveled to prevent shutter 101 from bending. The shutter assembly 100 may be fabricated on a mold from a metal such as aluminum and silicon alloy. In one implementation all surfaces of the shutter 101 may have a light absorbing finish. In another implementation the shutter 101 may have a light reflecting first surface 120 and light absorbing second surface 121. The light reflecting surface 120 reflects 80% or more light and the light absorbing surface 121 absorbs 80% or more light.

Depositing a layer of aluminum on smooth surfaces of a mold will provide shutter 101 with a mirror like first surface 120 and a black oxide layer may be formed on the second surface 121 by anodizing. The black oxide layer may be formed after etching the light transmitting regions 108 so the inner edges of the light transmitting regions 108 will be covered with the black oxide layer.

Also chromium or niobium oxide may be deposited or a black organic resin may be applied to the shutter 101 surface to form the light absorbing surface.

Without limitation, the parts of the shutter assembly 100 may have the following dimensions. The shutter 101 may have a width 115 between 50 to 1000 micrometer and a thickness from 0.5 to 5 micrometer. The light transmitting regions 108 may have a width 122 from 2 to 50 micrometer. The supports 104 and 105 may have a width from 2 to 20 micrometer and thickness from 0.5 to 5 micrometer. The supports 104 and 105 may have a length 112 which is 1.5 to 3 times greater than the width 122 of the light transmitting regions 108.

Figures 2A, 2B:
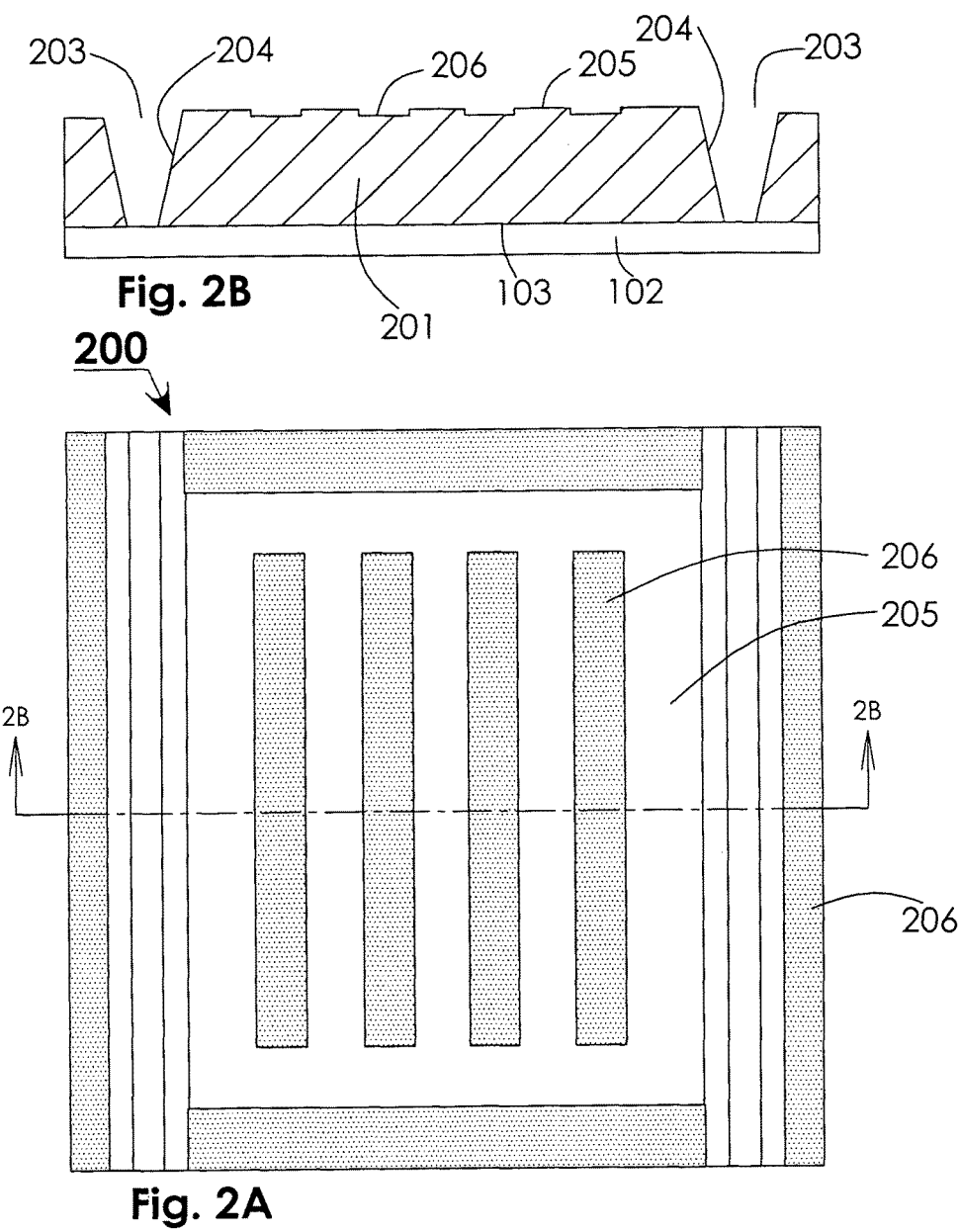
FIG. 2A is a top view of an exemplary mold for fabrication of the shutter assembly shown in FIG. 1A.
FIG. 2B is a sectional view taken along line 2B in FIG. 2A.

FIGS. 2A and 2B illustrate a mold 200 for fabrication of shutter assembly 100. FIG. 2A is a top view of the mold 200 and FIG. 2B is a cross-sectional view taken along lines 2B in FIG. 2A.

The mold 200 is constructed on the surface 103 of the substrate 102 using gray-scale or multiple masks photolithography. A layer of sacrificial material 201 is deposited on the surface 103. Grooves 203 and recessed regions 206 are formed on a surface 205 of the layer 201. The shutter assembly 100 is constructed by depositing and selectively etching a thin layer of conductive film on surfaces of the mold 200. The supports 104 and 105 are formed on side walls 204 of grooves 203. The side walls 204 have the same inclination angle 113 as the supports 104 and 105 with respect to the surface 103. The recessed regions 206 are provided to construct the shutter 101 with beveled edges.

The beveled edges help to prevent the shutter 101 from bowing or bending. A combination of directional and conformal deposition of conductive material may be used to control relative thickness of supports 104 and 105 and the shutter 101.

FIGS. 3A to 3D illustrate a light modulator 300 according to an illustrative embodiment of the invention.

Figure 3A:
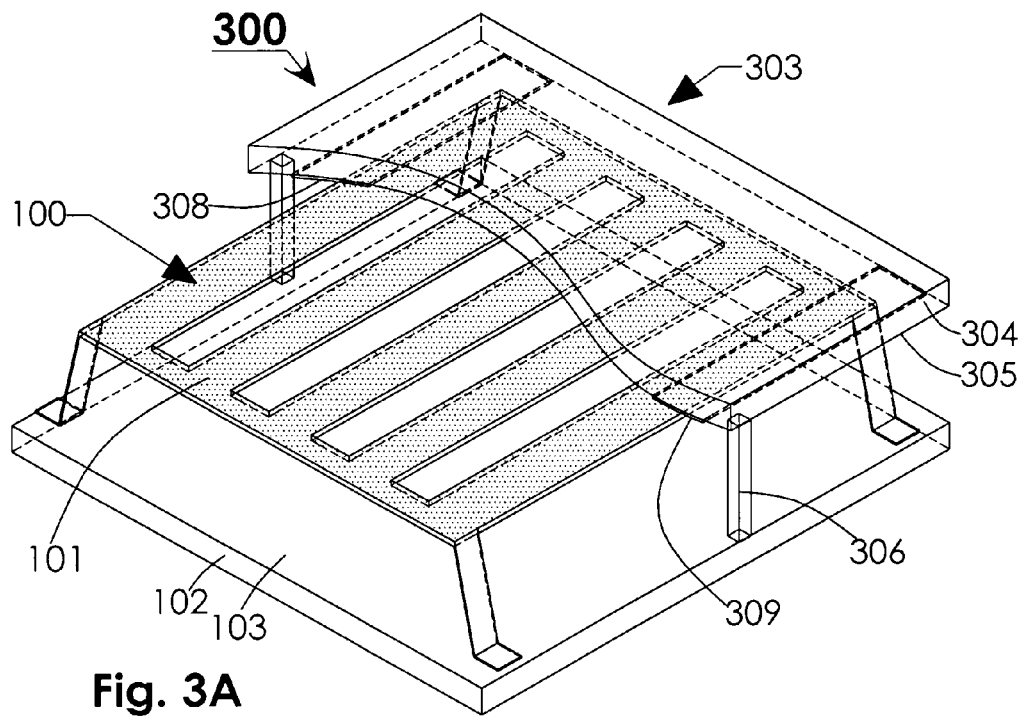
FIG. 3A is a perspective view of a light modulator according to an illustrative embodiment of the invention.
Figure 3B:
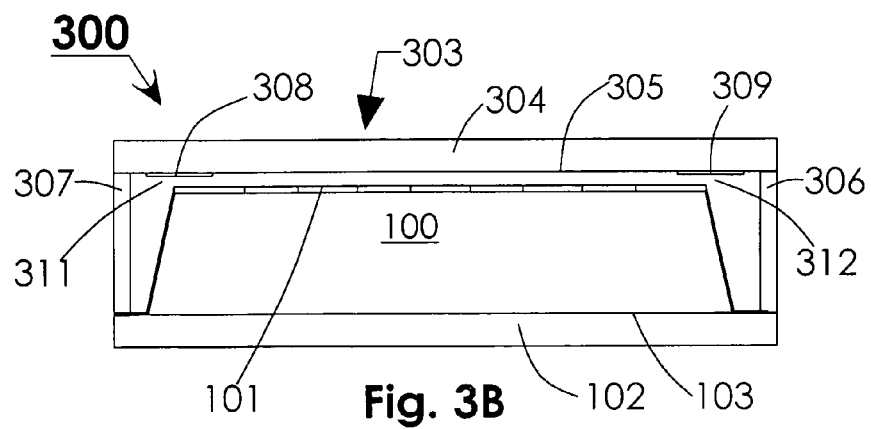
FIG. 3B is a front view of the light modulator shown in FIG. 3A.

Referring to FIGS. 3A and 3B, the modulator 300 includes the shutter assembly 100 of FIG. 1A and a cover assembly 303. The cover assembly 303 includes a transparent substrate 304 supported over the surface 103 of the substrate 102 with spacers 306 and 307. Two electrodes 308 and 309 are formed on an inner surface 305 of the substrate 304.

The electrode 308 and the conductive shutter 101 form a first electrostatic actuator 311 and the electrode 309 and the conductive shutter 101 form a second electrostatic actuator 312. In operation a voltage potential applied between the electrode 308 and the shutter 101 generates an electrostatic force (FIG. 3C) that pulls the supports 104 attached at the first end 106 of the shutter 101 to a near upright position with respect to the surface 103 and moves the shutter 101 laterally (FIG. 3C) to a first position or a voltage potential applied between the electrode 309 and the shutter 101 generates an electrostatic force (FIG. 3D) that pulls the supports 105 attached at the second end 107 of the shutter 101 to a near upright position with respect to the surface 103 and moves the shutter 101 laterally (FIG. 3D) to a second position.

Stored mechanical forces in the supports 104 and 105 return the shutter 101 from the first or the second positions to a mechanical rest or neutral position as shown in the FIG. 3B.

In the modulator 300, the first actuator 311 and the second actuator 312 each apply a force to the shutter 101 substantially in the same direction and move the shutter 101 laterally in opposite directions.

Figure 3C:
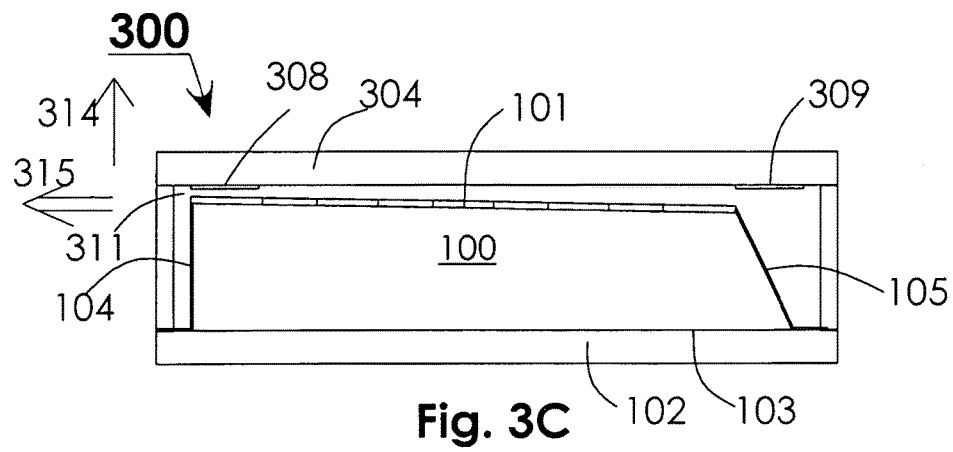
FIG. 3C is a front view of the light modulator shown in FIG. 3A illustrating a shutter located at a first position.

In FIG. 3C the arrow 314 indicates the direction of the force applied to the shutter 101 by the first actuator 311 and the arrow 315 indicates the direction of lateral movement of the shutter 101 from the mechanical rest position to the first position. The shutter 101 moves laterally from the mechanical rest position to the first position at least five times more than in the direction of the force applied by the first actuator 311 to the shutter 101.

Figure 3D:
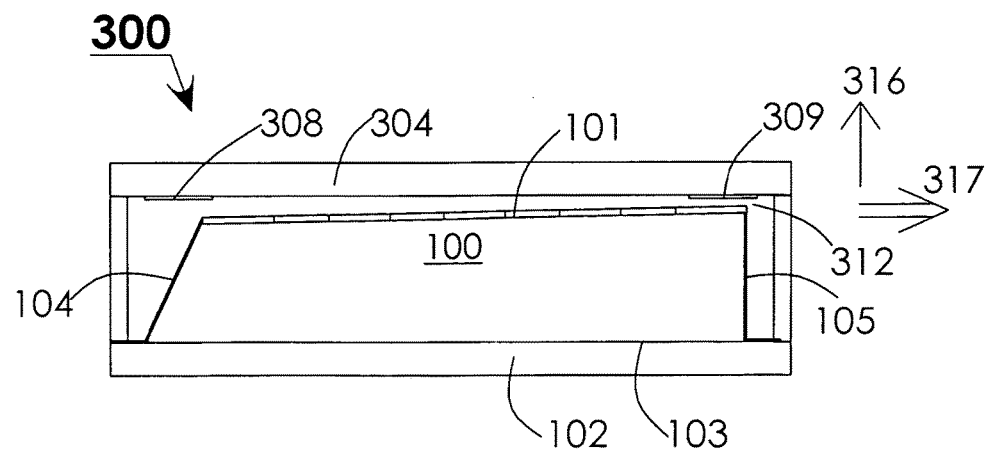
FIG. 3D is a front view of the light modulator shown in FIG. 3A illustrating the shutter located at a second position.

In FIG. 3D the arrow 316 indicates the direction of the force applied to the shutter 101 by the second actuator 312 and the arrow 317 indicates the direction of lateral movement of the shutter 101 to the second position.

Applying an increasing voltage to the actuator 311 and a decreasing voltage to the actuator 312 will gradually move the shutter between the first and second positions or applying a fixed voltage to the actuator 311 and a variable voltage to the actuator 312 also will move the shutter between the first and second positions gradually.

In a display the electrodes 308 and 309 may be formed wider and shared by shutter assemblies positioned in successive rows or columns.

Figure 4A:
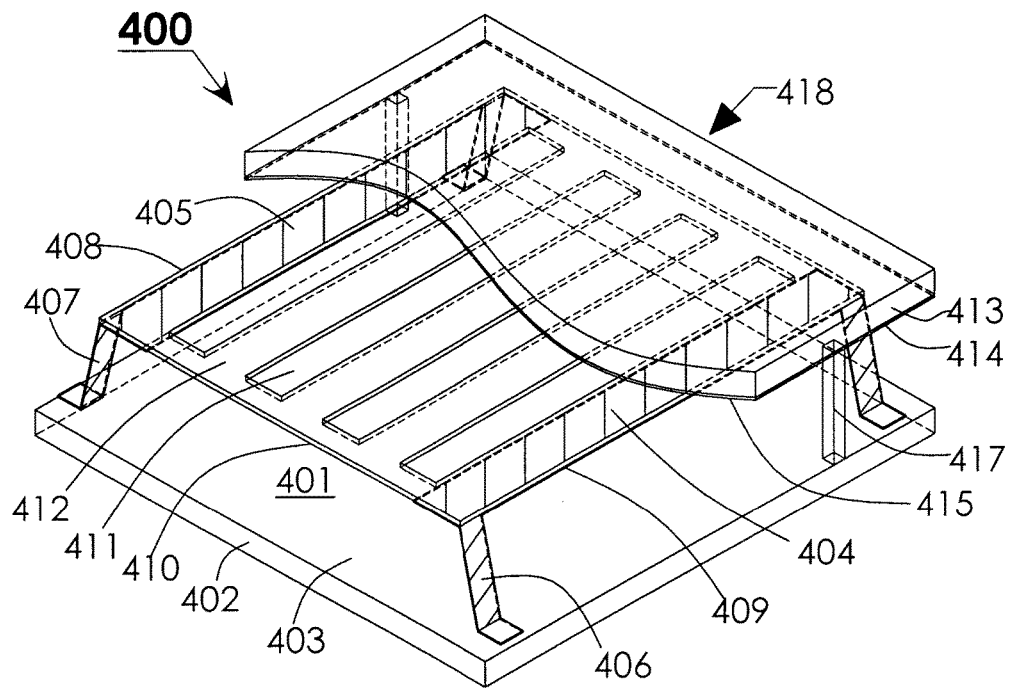
FIG. 4A is a perspective view of a light modulator according to an illustrative embodiment of the invention.
Figure 4B:
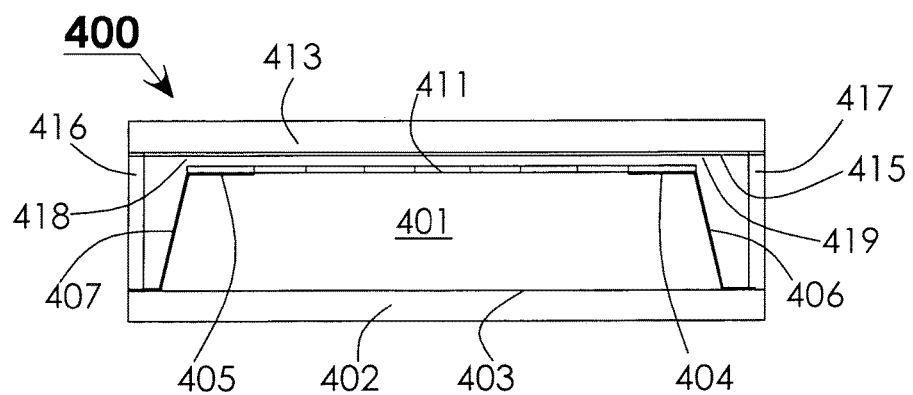
FIG. 4B is a front view of the light modulator shown in FIG. 4A.

FIGS. 4A and 4B illustrate a light modulator 400 according to an illustrative embodiment of the invention. The modulator 400 includes a shutter assembly 401 and a cover assembly 418. The shutter assembly 401 includes a shutter 410 that is supported over a surface 403 of a transparent substrate 402 with supports 406 and 407. The supports 407 are attached at a first end 408 of the shutter 410 and the supports 406 are attached at a second end 409 of the shutter 410. The shutter 410 is formed from an electrical insulator or a dielectric material and includes light transmitting regions 411 and light blocking regions 412. The shutter 410 further includes a first electrode 405 and a second electrode 404. Supports 407 provide an electrical connection from the surface 403 to the electrode 405 and supports 406 provide an electrical connection from the surface 403 to the electrode 404.

The cover assembly 418 includes a transparent substrate 413 supported on the surface 403 with spacers 416 and 417. The cover assembly 418 further includes a transparent conductive layer 415 formed on an inner surface 414 of the substrate 413 from a material such as indium thin oxide.

In the modulator 400 the first electrode 405 with the conductive layer 415 form a first electrostatic actuator 418 and the second electrode 404 with the conductive layer 415 form a second electrostatic actuator 419.

In operation the first actuator pulls the supports 407 to a near upright position with respect to the surface 403 and moves the shutter 410 laterally to a first position and the second actuator pulls the supports 406 to a near upright position with respect to the surface 403 and moves the shutter 410 laterally to a second position. Stored mechanical forces in the supports 406 and 407 return the shutter 410 from the first or the second positions to a mechanical rest or neutral position as shown in the FIG. 4B.

Figure 5A:
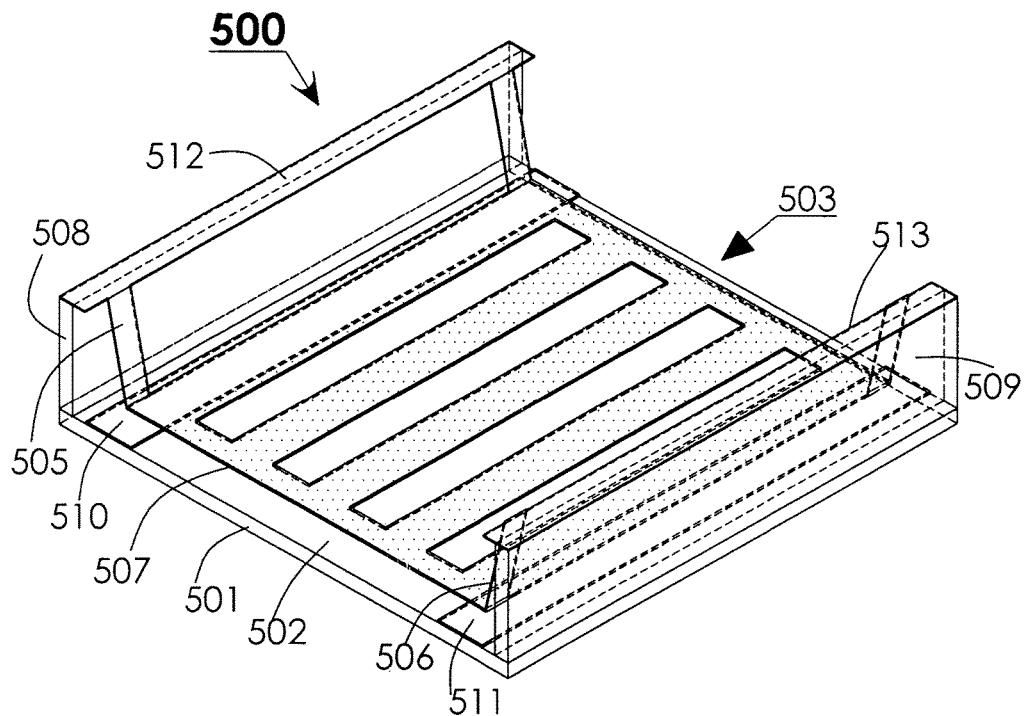
FIG. 5A is a perspective view of a light modulator according to an illustrative embodiment of the invention.
Figure 5B:
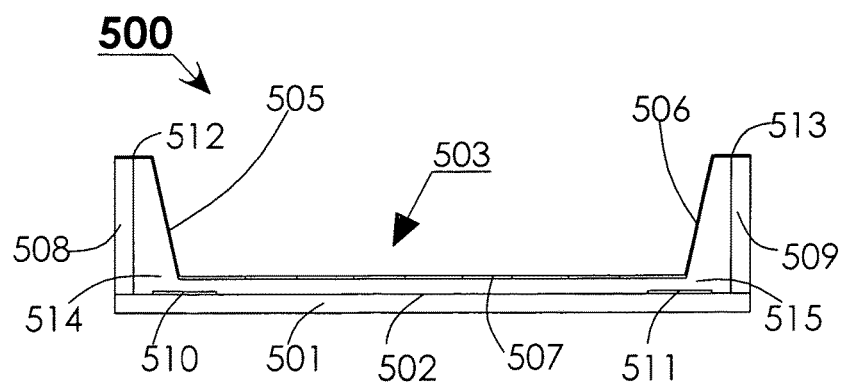
FIG. 5B is a front view of the light modulator shown in FIG. 5A.

FIGS. 5A and 5B illustrate a light modulator 500 according to an illustrative embodiment of the invention. The modulator 500 includes spacers 508 and 509 that are formed on a surface 502 of substrate 501 from a polymer and a shutter assembly 503. The shutter assembly 503 includes a shutter 507 and shutter supports 505 and 506 that are formed from a conductive material and are attached to the spacers 508 and 509 with conductive pads 512 and 513.

The modulator 500 further includes two electrodes 510 and 511 that are formed on the surface 502 of the substrate 501. The electrode 510 and the conductive shutter 507 form a first electrostatic actuator 514 and the electrode 511 and the conductive shutter 507 form a second electrostatic actuator 515.

The shutter assembly 503 may be constructed similar to the shutter assembly 401 and the two electrodes 510 and 511 can be replaced with a transparent conductive layer.

Figure 6A:
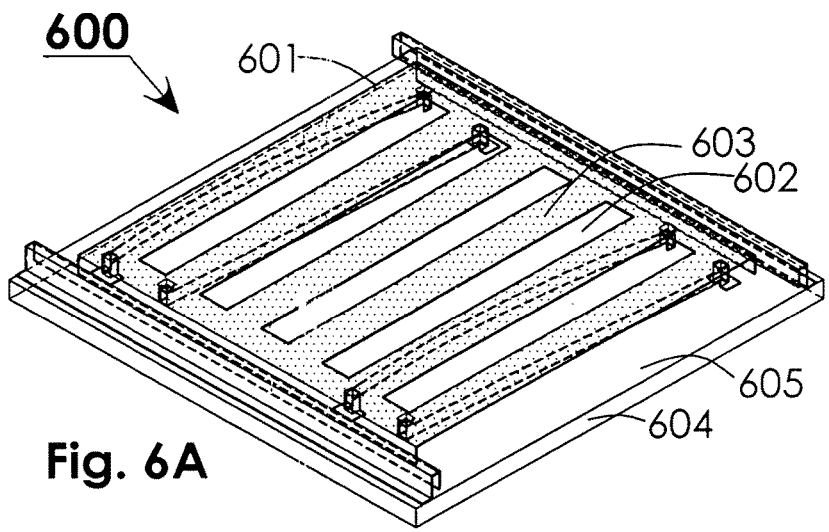
FIG. 6A is a perspective view of a light modulator according to an illustrative embodiment of the invention.
Figure 6B:
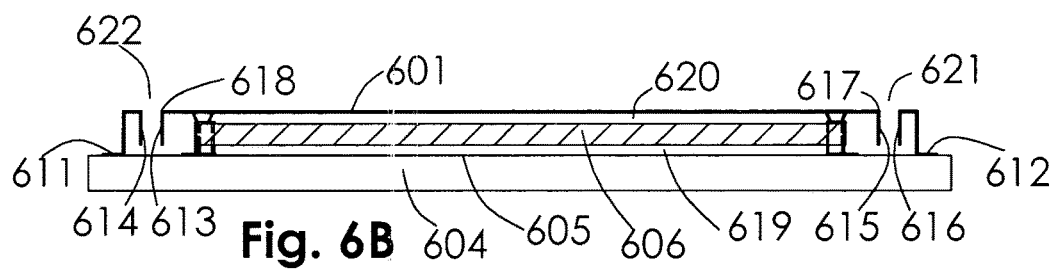
FIG. 6B is a side view of the light modulator shown in FIG. 6A.
Figure 6C:
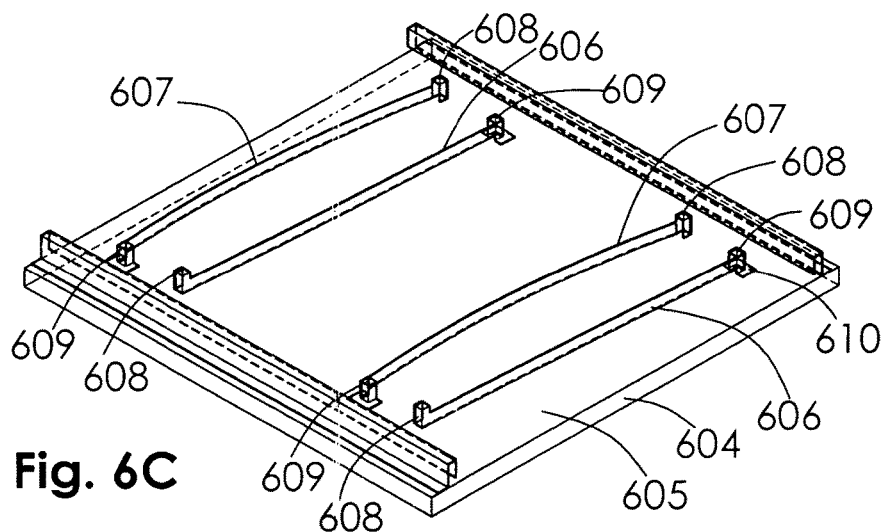
FIG. 6C is a perspective view showing shutter supports in the light modulator shown in FIG. 6A.

FIGS. 6A to 6F illustrate a light modulator 600 according to an illustrative embodiment of the invention. Referring to FIGS. 6A to 6C, the modulator 600 includes a light shutter 601 constructed from a conductive material and includes light transmitting regions 602 and light blocking regions 603.

The shutter 601 is supported on a surface 605 of a substrate 604 with four cantilever beams 606 and 607 that are formed between the shutter 601 and the surface 605 and substantially within the boundaries of the shutter 601 (FIG. 6C). A first end of each cantilever beams 606 and 607 is attached to the surface 605 with posts 609 and conductive pads 610, and a second end is attached to the shutter 601 with posts 608. The cantilever beams 606 are attached at a first end 618 of the shutter 601 and the cantilever beams 607 are attached at a second end 617 of the shutter 601. The beams 606 and 607 are positioned substantially parallel to the surface 605 and are spaced from the surface 605 by a first gap 619. Also the beams 606 and 607 are positioned substantially parallel to the shutter 601 and are spaced from the shutter 601 by a second gap 620. The cantilever beams 606 and 607 may be formed thin and long so it can bend or flex without requiring significant force. Also the beams 606 and 607 may be formed to have a sufficient height oriented vertically to the surface 605 to support the weight of the shutter 601.

The shutter 601 further includes a first flange 613 that extends from the first end or edge 618 of the shutter 601 towards the surface 605 within 5 degrees from the normal to the surface 605. The shutter 601 also includes a second flange 615 that extends from the second edge 617 towards the surface 605 within 5 degrees from the normal to the surface 605.

Figure 6D:
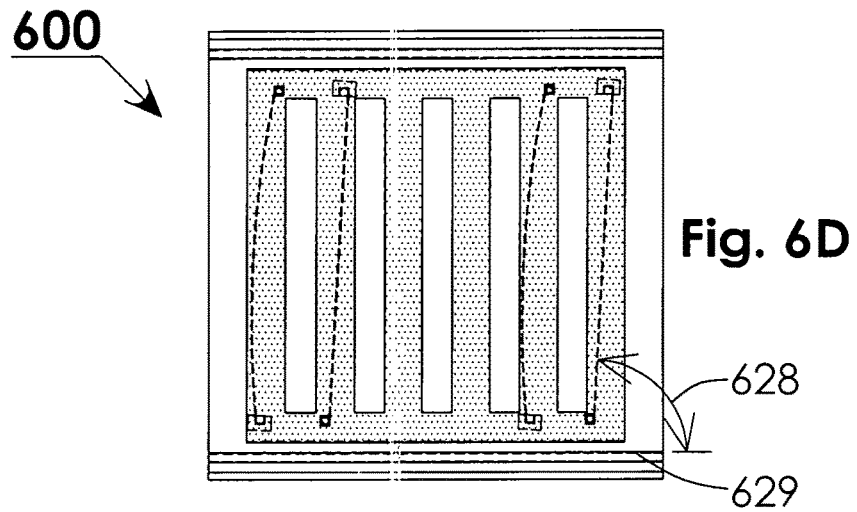
FIG. 6D is a top view of the light modulator shown in FIG. 6A.
Figure 6E:
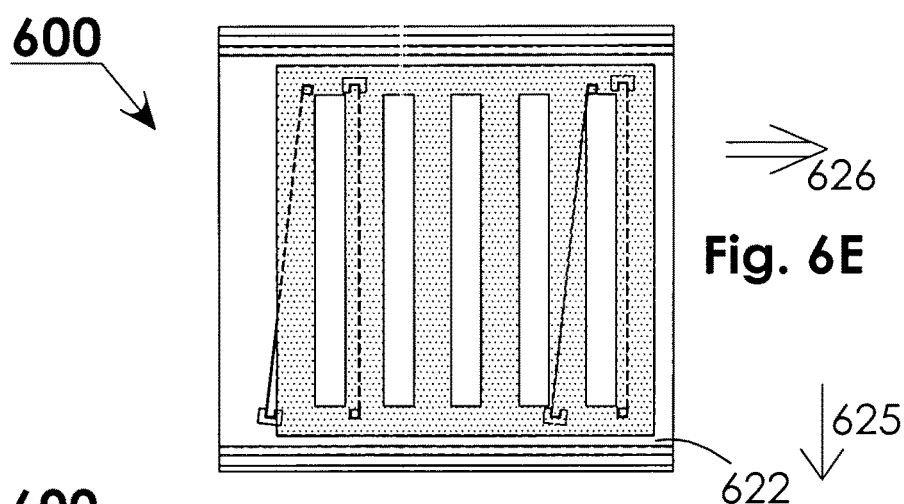
FIG. 6E is a top view of the light modulator shown in FIG. 6A illustrating the shutter located at a first position.

The beams 606 and 607 are inclined with respect to a surface 629 of the flange 613 and form an angle 628 between 70 to 89 degrees (FIG. 6D).

The modulator 600 further includes two electrodes 614 and 616 that extend from the surface 605 near to right angles. The electrode 614 is attached to the surface 605 with conductive pad 611 and the electrode 616 is attached to the surface 605 with conductive pad 612. The electrode 614 and the flange 613 form a first electrostatic actuator 622 and the electrode 616 and the flange 615 form a second electrostatic actuator 621.

Figure 6F:
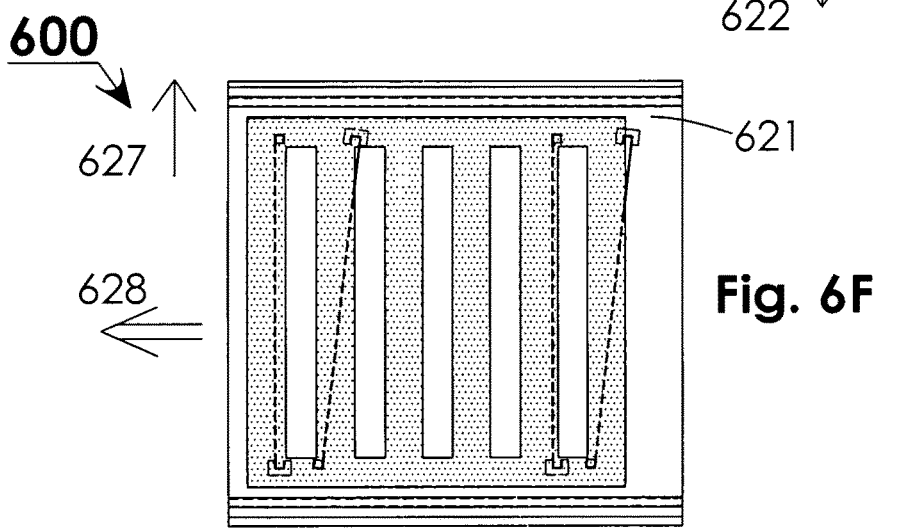
FIG. 6F is a top view of the light modulator shown in FIG. 6A illustrating the shutter located at a second position.

In operation the actuator 622 applies a first force 625 to the shutter 601, pulls the beams 606 that are attached at the first end 618 of the shutter 601 and moves the shutter 601 substantially in a lateral direction 626 with respect to the first force 625 to a first position (FIG. 6E), and the actuator 621 applies a second force 627 to the shutter 601, pulls the beams 607 that are attached at the second end 617 of the shutter 601 and moves the shutter 601 substantially in a lateral direction 628 with respect to the second force 627 to a second position (FIG. 6F). The shutter 601 moves in the lateral direction 626 at least 5 times more than in the direction of the first force 625.

Stored mechanical forces in the beams 606 and 607 return the shutter 601 from the first or the second positions to a mechanical rest or neutral position as shown in the FIG. 6D. The shutter 601 moves between the first and the second positions in a plane that is substantially parallel to the surface 605.

When shutter 601 moves from the mechanical rest position (FIG. 6D) to the first position (FIG. 6E) the linear distance increases between the posts 608 and 609 that are attached to the ends of the beams 607. For this reason, the beams 607 are formed slightly curved to compensate for the linear distance increase between the posts 608 and 609.

Figure 7A:
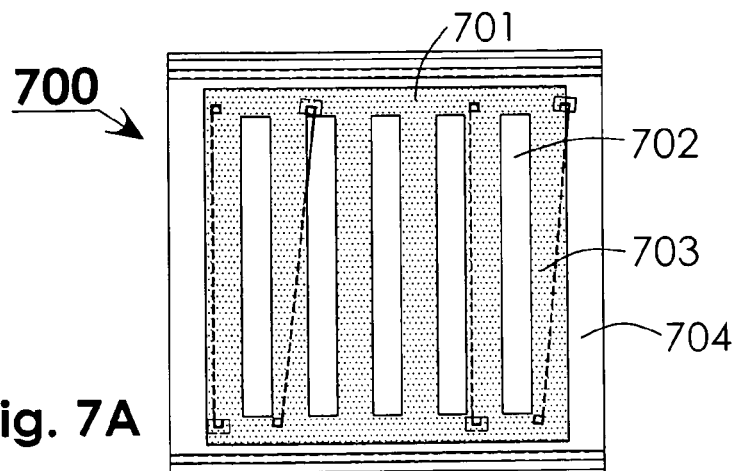
FIG. 7A is a top view of a light modulator according to an illustrative embodiment of the invention.
Figure 7B:
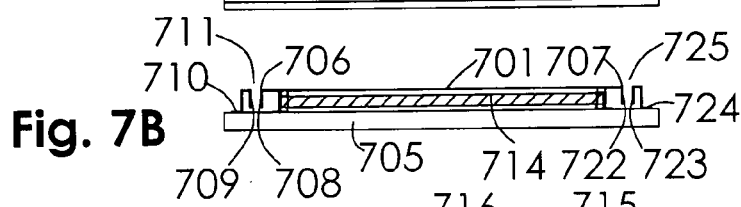
FIG. 7B is a side view of the light modulator shown in FIG. 7A.
Figure 7C:
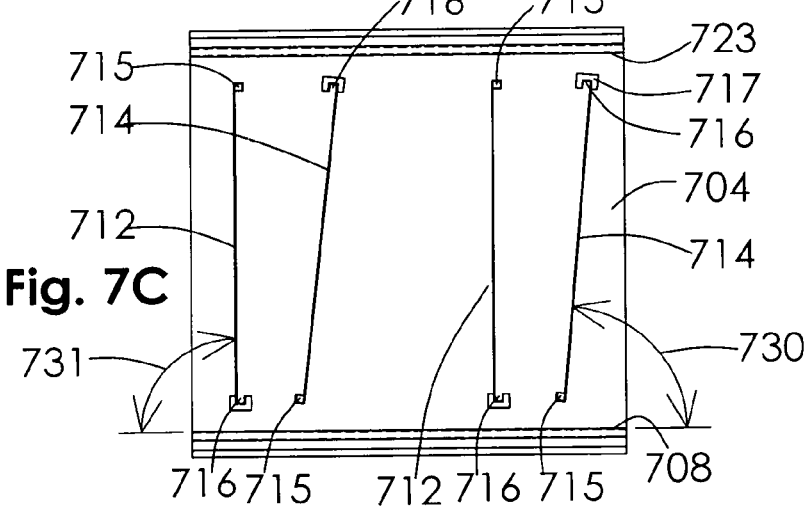
FIG. 7C is a top view showing shutter supports in the light modulator shown in FIG. 7A.

FIGS. 7A to 7D illustrate a light modulator 700 according to an illustrative embodiment of the invention. The modulator 700 includes a light shutter 701 constructed from a conductive material and includes light transmitting regions 702 and light blocking regions 703. The shutter 701 further includes a first flange 708 that is attached to the shutter 701 at a first end 706. The shutter 701 is supported on a surface 704 of a substrate 705 with four cantilever beams 712 and 714 (FIG. 7C).

A first end of each cantilever beams 712 and 714 is attached to the surface 704 with posts 716 and conductive pads 717, and a second end is attached to the shutter 701 with posts 715. The cantilever beams 714 are attached at the first end 706 of the shutter 701 and the cantilever beams 712 are attached at a second end 707 of the shutter 701. The cantilever beams 712 and 714 are substantially straight. The cantilever beams 714 are inclined with respect to the flange 708 and form an angle 730 between 70 to 89 degrees and the cantilever beams 712 form an angle 731 near to 90 degrees with the flange 708.

The modulator 700 further includes an electrode 709 that extends vertically from the surface 704 and is attached to the surface 704 with conductive pad 710. The electrode 709 and the flange 708 of the shutter 701 form an electrostatic actuator 711.

Figure 7D:
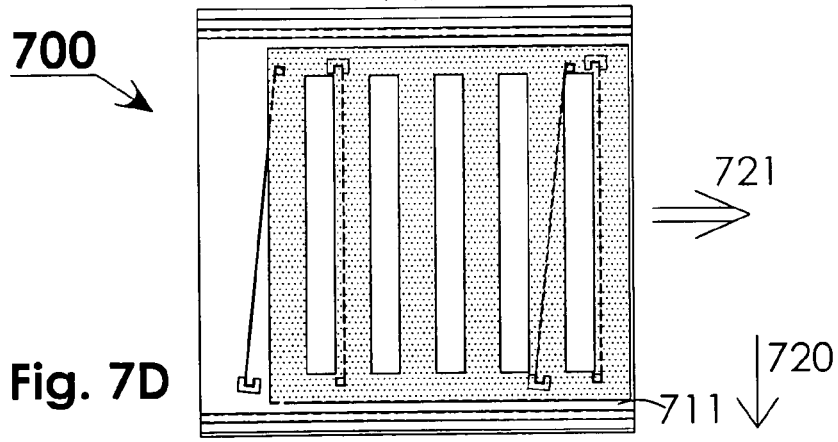
FIG. 7D is a top view of the light modulator shown in FIG. 7A illustrating the shutter located at a first position.

In operation the actuator 711 pulls the beams 714 that are attached at the first end 706 of the shutter 701 in a direction 720 and moves the shutter 701 substantially in a lateral direction 721 with respect to the direction 720 to a first position (FIG. 7D). Stored mechanical forces in the beams 712 and 714 return the shutter 701 from the first position to a mechanical rest or neutral position (FIG. 7A). The shutter 701 moves between the positions in a plane that is substantially parallel to the surface 704.

The modulator 700 may further include a second electrostatic actuator 725 formed by a second flange 722 attached to the shutter 701 at the second end 707 and a second electrode 723 that extends vertically from the surface 704 and is attached to the surface 704 with a conductive pad 724. In the modulator 700 the supports 712 limit the shutter 701 and the second flange 722 to move closer to the second electrode 723 therefore the second electrode 723 may be positioned at close distance from the second flange 722 to form an efficient actuator.

In a display a pixel addressing voltage may be applied to the second actuator 725 for selectively holding the shutter 701 at the mechanical neutral position.

FIGS. 8A to 8F illustrate manufacturing steps of a shutter support 800 according to an illustrative embodiment of the invention similar to the supports in modulators 600 and 700. FIG. 8A illustrates the shutter support 800 that includes a cantilever beam 803. A first end of the beam 803 is attached to a first post 804 that connects the beam 803 to a surface 801 of a substrate 802 with a pad 805 and a second end of the beam 803 is attached to a second post 806 which later connects to a shutter. The first post 804 and the second post 806 each have three sides and a top.

The support 800 is formed on a mold 807. The first manufacturing step is forming the mold 807 from a sacrificial material on the surface 801 of the substrate 802 (FIG. 8B). The mold 807 is formed with a shape of a rectangular prism and has four sidewalls 808, 809, 810 and 811 and a top 812. The sidewalls are oriented vertically to the surface 801 within +/−5 degrees with respect to the normal. Next steps are depositing a conformal layer of conductive material 814 on the surfaces of the mold 807 and the surface 801 by a magnetron sputtering and applying a conformal layer of positive photoresist 815 on the conductive layer 814 by an electrophoretic deposition or spraying (FIG. 8C).

The next step is positioning a first photomask 816 over the mold 807 (FIG. 8D) and illuminating the photoresist layer 815 with a UV light source having collimated and inclined rays with less than 2 degree divergence and an inclination angle 817 with respect to the surface 801 between 45 to 75 degrees from directions of sidewalls 808 and 809 (FIGS. 8E and 8F). The mold 807 and the first photomask 816 block the UV light from the regions on the photoresist layer 815 that define the geometric shapes of the cantilever beam 803, the first post 804, the second post 806 and the pad 805. A further step is positioning a second photomask 818 over the mold 807 (FIG. 8G) and illuminating the photoresist layer 815 from the direction of sidewall 811 (FIG. 8J). This will illuminate the photoresist layer 815 applied on the lower part of the sidewall 811. The steps shown in FIGS. 8G and 8J may be omitted if the second post 806 is formed with only two sides formed on the sidewalls 808 and 809 of the mold 807 and a top.

After illuminating from all three directions the photoresist layer 815 is developed and unprotected regions of the conductive layer 814 are removed by etching. The cantilever beam 803 formed on the mold 807 has a width equal to the thickness of the conductive layer 814.

In the case that the conductive layer 814 is formed from a material such as aluminum that can reflect UV light, a light absorbing layer may be applied or formed on the conductive layer 814 before applying the photoresist layer 815. This will reduce reflections of UV light from horizontal and vertical surfaces. To reduce reflections from the surface of the photoresist layer 815, the mold and the mask may be immersed in a liquid with a similar refractive index as the photoresist layer 815.

FIGS. 9A to 9F illustrate manufacturing steps of a shutter 900 and an electrode 905 according to an illustrative embodiment of the invention similar to the modulators 600 and 700.

Figure 9A:
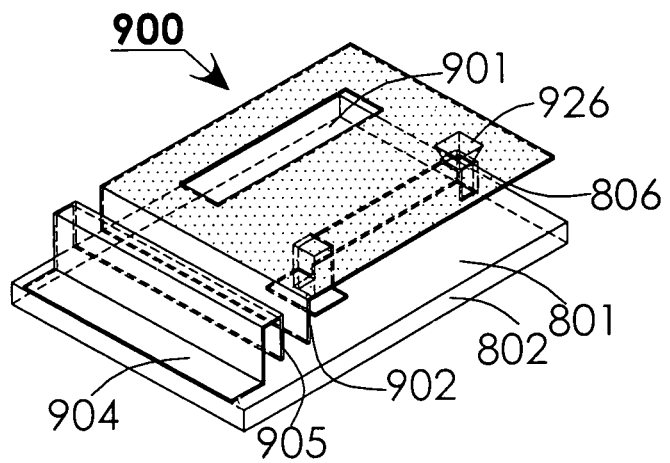
FIG. 9A is a perspective view of a shutter according to an illustrative embodiment of the invention.

FIG. 9A illustrates a shutter 900 that includes a light transmitting region 901 and a flange 902. The shutter 900 is connected to the post 806 of the support 800 that was described above. FIG. 9A further illustrates an electrode 905 that is attached to a surface 801 of a substrate 802 with a pad 904.

Figure 9B:
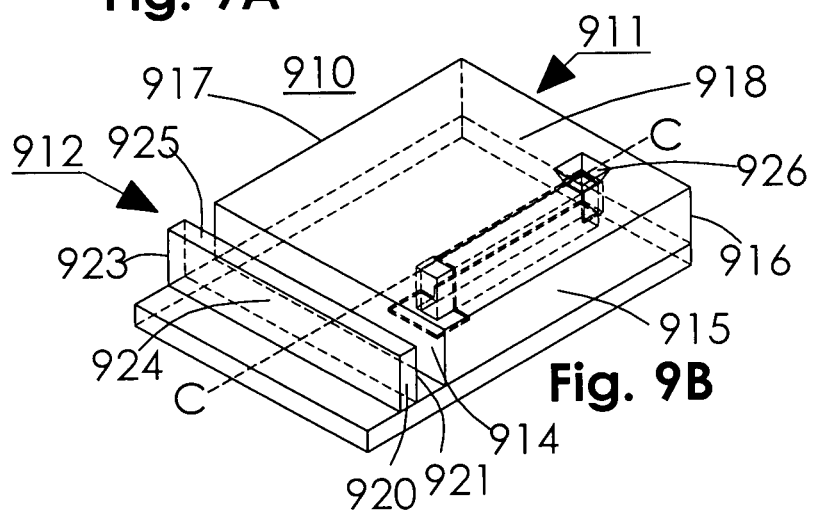
FIG. 9B is a perspective view of a mold for manufacturing the shutter shown in FIG. 9A.

The first manufacturing step is forming a mold 910 comprising two rectangular prisms 911 and 912 from a sacrificial material on the surface 801 of the substrate 802 (FIG. 9B). The prism 911 includes four sidewalls 914, 915, 916, 917 and a top 918. The prism 912 includes four sidewalls 920, 921, 923, 924 and a top 925. The sidewalls are oriented vertically with respect to the surface 801 within +/−5 degrees from the normal. A via hole 926 is formed on the top 918 of prism 911 for connecting the shutter 900 to the post 806 of support 800.

Figure 9C:
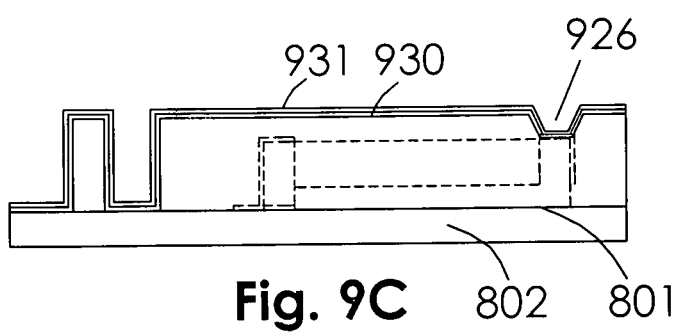
FIG. 9C is a sectional view taken along line C-C in FIG. 9B illustrating a step for manufacturing the shutter shown in FIG. 9A.
Figure 9D:
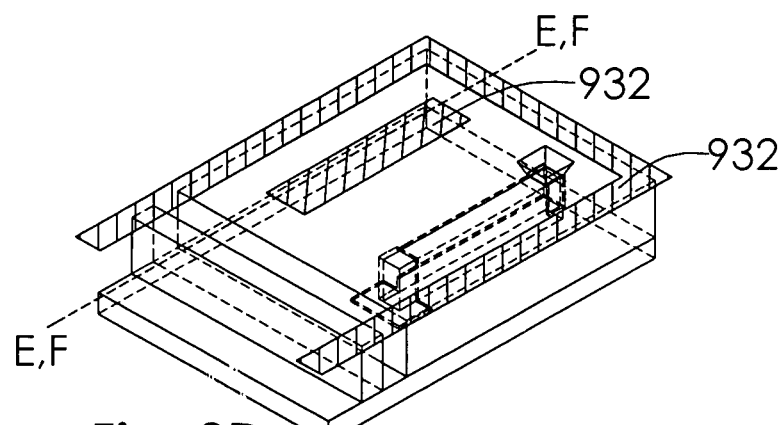
FIG. 9D is a perspective view illustrating a step for manufacturing the shutter shown in FIG. 9A.

Next steps are depositing a conformal layer of conductive material 930 on the surfaces of the mold 910 and the surface 801 and depositing a conformal layer of negative photoresist 931 on the conductive layer 930 (FIG. 9C).

Figure 9E:
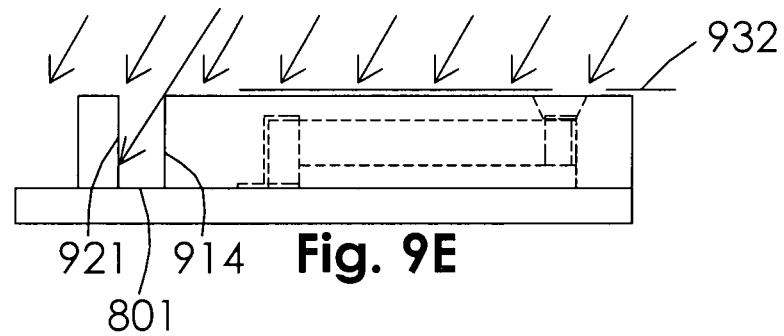
FIG. 9E is a sectional view taken along line E-E in FIG. 9D illustrating a step for manufacturing the shutter shown in FIG. 9A.
Figure 9F:
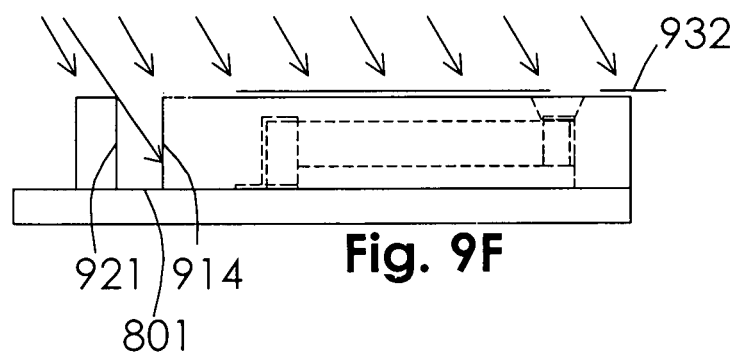
FIG. 9F is a sectional view taken along line F-F in FIG. 9D illustrating a step for manufacturing the shutter shown in FIG. 9A.

The following step is positioning a photomask 932 over the mold 910 (FIG. 9D) and illuminating the photoresist layer 931 with a UV light source having collimated and inclined rays from directions of sidewalls 916 and 924 (FIGS. 9E and 9F).

The mask 932 blocks UV light illumination of the photoresist layer 931 applied on surfaces of the sidewalls 915, 916, 917, 920 and 923, and a region of the top surface 918 where the light transmitting region 901 of the shutter 900 is formed. The mold blocks lower portions of surfaces of the sidewalls 914 and 921 where the flange 902 and the electrode 905 are formed and a portion of the surface 801 between the sidewalls 914 and 921.

After illuminating from both directions the photoresist layer 931 is developed and unprotected regions of the conductive layer 930 is etched.

The next step is removing the sacrificial layer and releasing the shutter 900 and the support 800.

The shutter 900 may be formed to include flanges such as the flange 902 on all four edges of the shutter 900. These flanges can effectively block stray light from exiting a display thereby improving contrast.

Figure 10A:
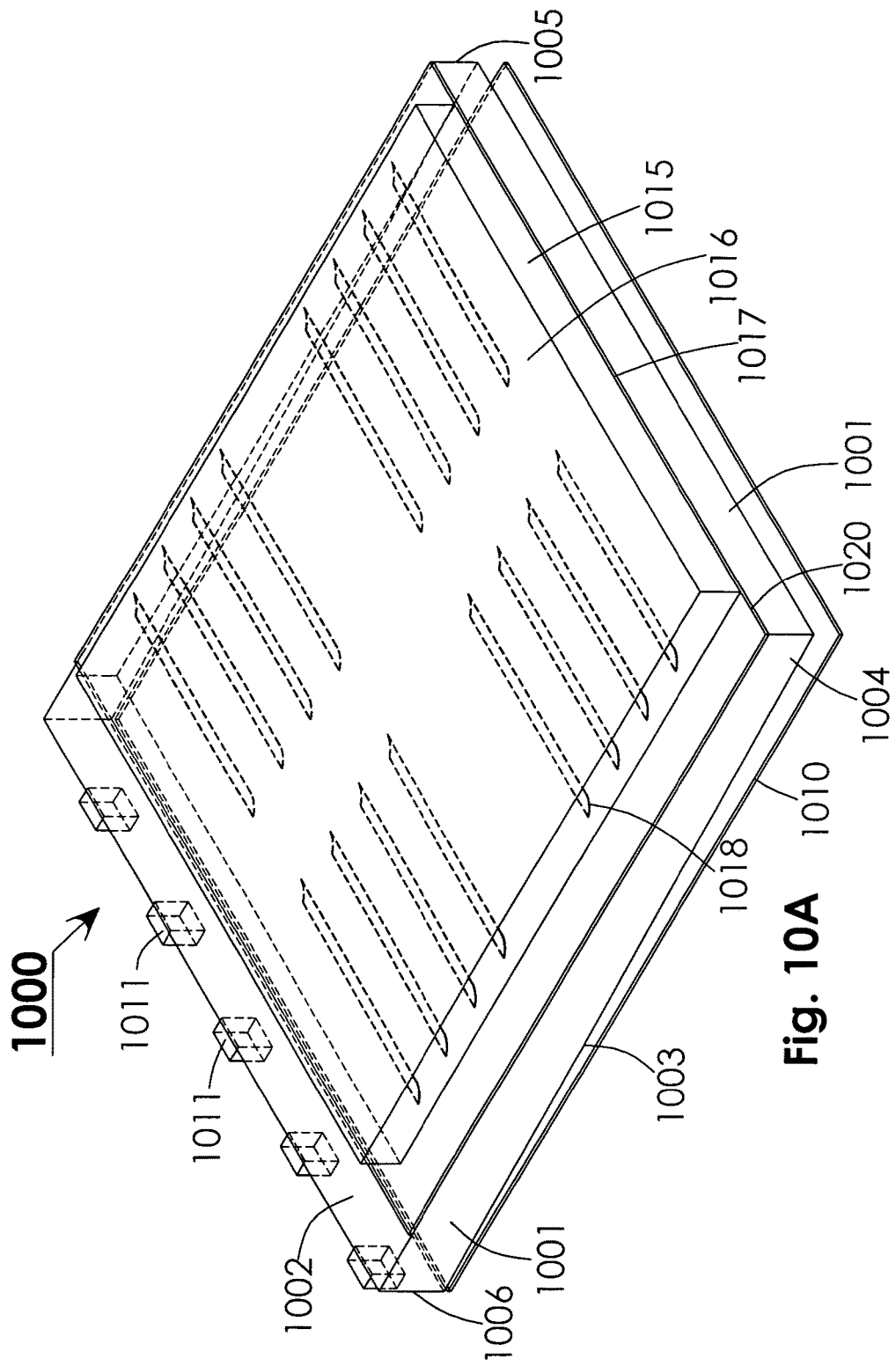
FIG. 10A is a perspective view of a display backlight according to an illustrative embodiment of the invention.

FIGS. 10A, 10B and 10C illustrate a display backlight 1000 according to an illustrative embodiment of the invention. FIG. 10A is a perspective view of the backlight 1000, FIG. 10B is a side view of the backlight 1000 and FIG. 10C is an enlarged view of the area designated as 10C in FIG. 10B.

The backlight 1000 includes a generally planar light guide 1001 constructed from acrylic or other transparent material having a refractive index n1 with a value between 1.45 and 1.6. The light guide 1001 includes a top surface 1002, a bottom surface 1003, opposing side surfaces 1004 and 1005 and a light input end 1006. The bottom surface 1003 is inclined with respect to the top surface 1002 and forms an angle 1009 (FIG. 10B) with a value between approximately 0.1 degrees to 2.0 degrees. The bottom surface 1003 converges with the top surface 1002 in a direction away from the light input end 1006.

The backlight 1000 further includes a light absorbing film 1010 positioned proximate to the bottom surface 1003 of light guide 1001 and a plurality of light sources 1011 positioned proximate to the light input end 1006.

The backlight 1000 also includes a first optical layer 1015 constructed from a substantially transparent material having a refractive index n2 with a value between approximately 1.45 and 1.6. First optical layer 1015 comprises a light exit surface 1016, a light input surface 1017, and a plurality of embedded light reflectors 1018 located between light input surface 1017 and light exit surface 1016. The light reflectors 1018 are formed from a thin light reflecting material such as aluminum or silver. The light reflectors 1018 may have a substantially flat surface or a curved surface having a cross section with a radius of curvature between approximately 20 to 80 micron. The light reflectors 1018 are inclined with respect to the top surface 1002 of the light guide 1001 and form an angle 1026 with a value between approximately 20 degrees and 40 degrees.

The backlight 1000 also includes a second optical layer 1020 formed between light input surface 1017 of the first optical layer 1015 and the top surface 1002 of light guide 1001. The second optical layer 1020 is constructed from a fluoropolymer or other substantially transparent material having a refractive index n3 with a value between approximately 1.3 and 1.4.

In operation light rays 1023 entering from the light input end 1006 of light guide 1001 reflect from the top surface 1002 and the bottom surface 1003 and change angles towards normal with respect to the top surface 1002. Light rays 1023 exit the light guide 1001 when the incident angle to the top surface 1002 is less than the critical angle 1024 (FIG. 10C) defined by the refractive index n1 of light guide 1001 and refractive index n3 of the second optical layer 1020. Light rays 1023 passing through the second optical layer 1020 enter the first optical layer 1015 from the light input surface 1017 and change the angle defined by the refractive index n2 of the first optical layer 1015. Most light rays 1023 entering the first optical layer 1015 reflect internally from the light exit surface 1016. Light rays exit the first optical layer 1015 from the light exit surface 1016 by reflecting from embedded light reflectors 1018. Light rays reflecting from curved light reflectors 1018 exit the first optical layer 1015 from the light exit surface 1016 and converge at a distance 1025 from the light exit surface 1016.

The backlight 1000 may also include a transparent substrate such as a glass substrate and a layer of dichroic filter interposed between the first optical layer 1015 and the second optical layer 1020.

Steps for fabrication of an optical layer 1108 with embedded light reflectors or light reflecting facets 1106 are illustrated in FIGS. 11A to 11D. In step (A) micro-prisms 1101 are constructed on the substrate 1103 using photolithography from a transparent UV curing liquid polymer. In step (B) the substrate 1103 is tilted about angle 1105 (FIG. 11B) and extensions 1104 of micro-prisms 1101 are formed from the same liquid polymer. The micro-prisms 1101 with the extensions 1104 also may be molded. In step (C) a reflective mirror film is deposited on each facet of extensions 1104 to form light reflecting facets 1106. In step (D) grooves 1107 are filled with the same UV curing liquid polymer. FIG. 11D illustrates a completed construction of the optical layer 1108 with embedded light reflecting facets 1106.

The optical layer 1108 may be combined with shutter assemblies 100 or 401 in the modulators 300 and 400 disclosed above. The optical layer 1108 may be constructed on a substrate before constructing the shutter assemblies 100 or 401 and positioned between the shutter supports. For the modulators 500, 600 or 700 that have a shutter located at close distance from the surface of a substrate, embedded light reflectors may be constructed in the substrate.

FIGS. 12A, 12B and 12C illustrate steps of manufacturing a glass substrate 1200 with embedded light reflectors 1205 according to an illustrative embodiment of the invention. The first step is etching grooves 1203 in the glass substrate 1200. The next three steps are similar to the steps B, C and D described above. The second step is tilting the substrate 1200 and forming an extension 1204 inside each groove from a UV curing liquid polymer. The third step is depositing a reflective mirror film on the extensions 1204 to form light reflecting facets 1205. The fourth step is filling the grooves with the same UV curing liquid polymer. FIG. 12C illustrates glass substrate 1200 constructed with embedded light reflectors 1205. Cured polymer preferably has substantially the same refractive index as the glass substrate 1200. In the backlight 1000, the first optical layer 1015 may be replaced with the glass substrate 1200 and modulators 500, 600 or 700 may be constructed on the glass substrate 1200.

FIGS. 13A and 13B illustrate a display cover assembly 1400 according to an illustrative embodiment of the invention. The cover assembly 1400 includes a transparent substrate 1401 having a first surface 1402 and a second surface 1403. The cover assembly 1400 also includes a light diffusing layer 1404 formed on the first surface 1402 and a light absorbing layer 1405 formed on the light diffusing layer 1404. For thin substrates with thickness 200 micrometer or less, diffusing layer 1404 may be formed on the second or outer surface 1403 and the light absorbing layer 1405 may be formed on the inner surface 1402 of the substrate 1401. The light absorbing layer 1405 includes light transmitting regions 1407 and opaque light absorbing regions 1406. The cover assembly 1400 may further include electrodes such as electrodes 308 and 309 of modulator 300 formed on the opaque light absorbing regions 1406 of the light absorbing layer 1405 having a light reflecting mirror surfaces or a transparent conductive layer such as the electrode 415 in the modulator 400.

The light absorbing layer 1405 may be formed from a conductive material. The conductive light absorbing layer 1405 may act as an EMI or electrostatic shield in a display or an electrode for an actuator such as the actuators in the modulator 400.

The light absorbing layer 1405 may absorb 80% or more light impinging the opaque light absorbing regions 1406 and transmit less than 1% light.

Displays based on electromechanical light modulators may include large numbers of modulators arranged in rows and columns. Each picture element or pixel in a display may include one or more modulators. For illustrative purposes the following drawings illustrate displays with only one modulator.

Figure 14A:
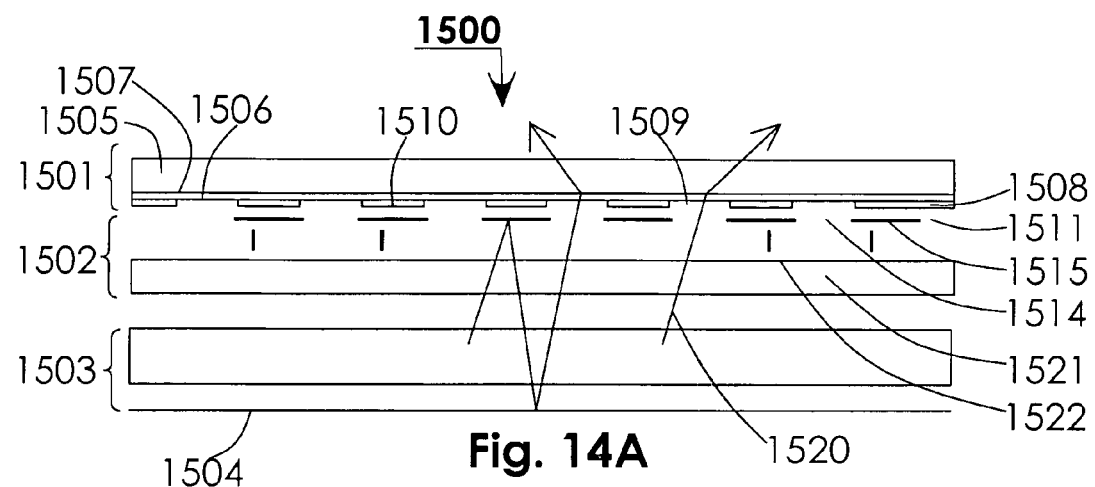
FIG. 14A is a sectional view of a display according to an illustrative embodiment of the invention illustrating a shutter located at a first position.
Figure 14B:
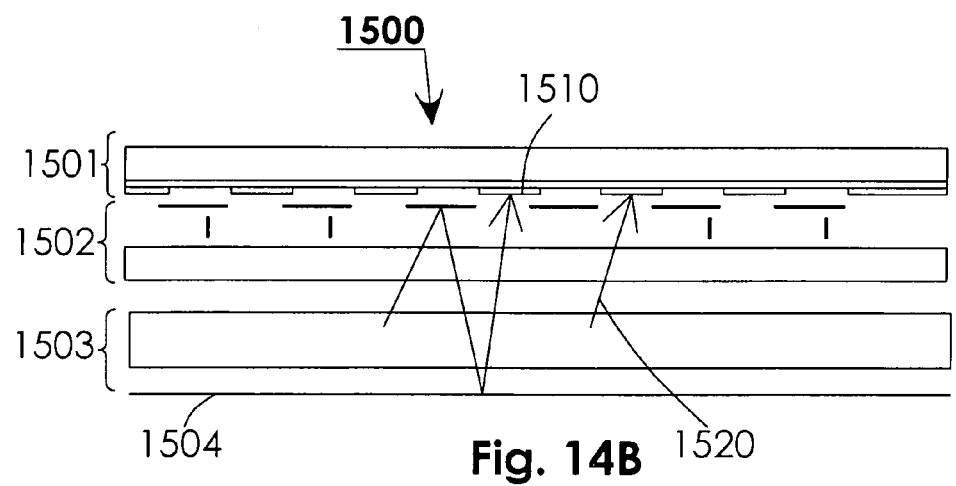
FIG. 14B is a sectional view of the display shown in FIG. 14A illustrating the shutter located at a second position.

FIGS. 14A and 14B illustrate a cross sectional views of a display 1500 according to an illustrative embodiment of the invention. The display 1500 includes a cover assembly 1501, a modulator 1502 and a backlight 1503 that includes a rear reflector 1504. The cover assembly 1501 includes a transparent substrate 1505, a light diffuser layer 1506 formed on a first surface 1507 of the substrate 1505 and a light absorbing layer. 1508 formed on the light diffuser layer 1506. The light absorbing layer 1508 includes a light transmitting regions 1509 and opaque light absorbing regions 1510. The modulator 1502 includes a shutter 1511 having light transmitting regions 1514 and light blocking regions 1515. The surface of the shutter 1511 facing the backlight 1503 is a light reflecting surface and the surface facing the light absorbing layer 1508 is a light absorbing surface. The light transmitting regions 1509 of the light absorbing layer 1508 are larger than the light transmitting regions 1514 of the shutter 1511 and are smaller than the light blocking regions 1515' of the shutter 1511. In FIG. 14A the shutter 1511 is at a first or ON position and in FIG. 14B the shutter 1511 is at a second or OFF position. Light 1520 from the backlight 1503 impinging the light transmitting regions 1514 of the shutter 1511 transmit through the light transmitting regions 1509 of the light absorbing layer 1508 when the shutter 1511 is at a first position (FIG. 14A) and is absorbed in the light absorbing layer 1508 when the shutter is at a second position (FIG. 14B). Light impinging the light blocking regions 1515 of the shutter 1511 reflects back to the backlight 1503 and recycles by reflecting from the rear reflector 1504. The modulator 1502 may be any one of the modulators disclosed above or a modulator that includes a shutter with a light reflecting surface facing the backlight 1503 for recycling light emitted from the backlight 1503.

It is important to design a modulator wherein shutter supports do not take substantially more display surface than required by the shutter so the shutters may be positioned substantially close to each other allowing only a space for the shutter movement and some conductors between them.

The above disclosed shutter assemblies meet this requirement. Compared with some prior art shutter assemblies where shutter supports are positioned at sides of the shutter and take more than 50% display surface, in the above disclosed shutter assemblies the shutter supports are located between the shutter and a surface over which the shutter is supported and are positioned substantially within boundaries of the shutter which includes the shutter movement between first and second positions.

This increases light efficiency by increasing total light transmitting regions relative to the display surface and reduces the gap between rows and columns of the display.

In the display 1500 the light absorbing layer 1508 may be formed from a conductive material and can replace the electrode 415 in the modulator 400 disclosed above.

The electrodes 308 and 309 of the modulator 300 may be formed on the light absorbing layer 1508 having light reflecting surface facing the backlight 1503 and the shutter 101 may be supported on a surface 1522 of the substrate 1521. The shutter 601 of the modulator 600 and the shutter 701 of the modulator 700 also may be supported on the surface 1522 of the substrate 1521. Spacers 508 and 509 of the modulator 500 may be formed on the light absorbing layer 1508 and the shutter 503 may be suspended from the spacers 508 and 509.

In the display 1500 the backlight 1503 emits a surface light and may be an edge lit or a direct lit backlight known from the LCD displays.

FIGS. 15A and 15B illustrate a cross sectional views of a display 1700 according to an illustrative embodiment of the invention. The display 1700 includes a cover assembly 1701, a modulator 1702 and a backlight 1703. The cover assembly 1701 includes a transparent substrate 1705, a light diffuser layer 1706 formed on a first surface 1707 of the substrate 1705 and a light absorbing layer 1708 formed on the light diffuser layer 1706. The light absorbing layer 1708 includes a light transmitting regions 1709 and light absorbing regions 1710. The modulator 1702 includes a shutter 1711 having light transmitting regions 1714 and light blocking regions 1715. The surface of the shutter 1711 facing the backlight 1703 may be a light reflecting surface or a light absorbing surface and the surface facing the light absorbing layer 1708 is a light absorbing surface. The light transmitting regions 1709 of the light absorbing layer 1708 are larger than the light transmitting regions 1714 of the shutter 1711 and are smaller than the light blocking regions 1715 of the shutter 1711. The modulator 1702 further includes a substrate 1716 having a light exit surface 1721 and embedded light reflecting facets 1717. The facets 1717 are curved and cause light 1720 from the backlight 1703 to exit the substrate 1716 and converge at the light transmitting regions 1714 of the shutter 1711. The shutter 1711 is supported on the surface 1721 of the substrate 1716. The backlight 1703 includes a light guide 1719 an optical layer 1718 positioned between the light guide 1719 and the substrate 1716. The backlight 1703 is similar to the backlight 1000 of FIGS. 10A to 10C. The backlight 1703 further includes a light absorbing layer 1704 positioned behind the light guide 1719 for absorbing stray light or light that reflects from the shutter 1711.

In FIG. 15A the shutter 1711 is at a first or ON position and in FIG. 15B the shutter 1711 is at a second or OFF position. Light 1720 emitted from the substrate 1716 transmits through the light transmitting regions 1714 of the shutter 1711 and the light transmitting regions 1709 of the light absorbing layer 1708 when the shutter 1711 is at a first position (FIG. 15A) and is blocked by the light blocking regions 1715 of the shutter 1711 when the shutter 1711 is at a second position (FIG. 15B). Light reflecting back from the light blocking regions 1715 of the shutter 1711 is absorbed in the light absorbing layer 1704.

In the display 1700 curved reflectors 1717 increase the display's viewing angles and reduce the required moving distance of the shutter 1711 between ON and OFF positions compared with flat reflectors.

The displays described above may further include spacers for maintaining precise distance between the substrates, row and column conductors formed on one or both substrates, one or more thin film transistors and a storage capacitor for addressing the display pixels, a ground or power plane, a common interconnect for resetting the display pixels, dichroic or color filters and antireflection coatings.

The displays described above may be labeled as electro-mechanical, micromechanical, micro-electromechanical or micro-electro-mechanical systems (MEMS) display. The displays described above may be a monochrome display, a color display or a color sequential display.

Having now described the invention in detail in accordance with the requirements of the patent statutes, those skilled in this art will have no difficulty in making changes and modifications in the individual parts or their relative assembly or fabrication methods in order to meet specific requirements or conditions. Such changes and modification may be made without departing from the scope and spirit of the invention, as set forth in the following claims.

The invention claimed is:

1. A display comprising:
a light absorbing layer having a light transmitting regions, a backlight including a rear reflector for reflecting light towards the light absorbing layer and a plurality of modulators each including a shutter positioned between the backlight and the light absorbing layer, said shutter having light transmitting regions and a light reflecting surface facing the backlight for recycling the light emitted from the backlight, wherein said shutter supported over a surface with a plurality of supports that are located substantially within the shutter boundaries which includes the shutter movement between a first and a second position.

2. The display of the claim 1 wherein light from the backlight impinging said light transmitting regions of the shutter transmit through the light transmitting regions of the light absorbing layer when the shutter is at said first position and are absorbed in the light absorbing layer when the shutter is at said second position.

3. The display of the claim 1 wherein said light absorbing layer is formed from a conductive material and said shutter includes a first and a second electrode in which each said first and second electrodes forms an electrostatic actuator with the conductive light absorbing layer.

4. The display of the claim 1 wherein said plurality of supports are attached at a first and a second end of the shutter and wherein the supports attached at said first and second ends are inclined with respect to each other and are inclined with respect to the surface.

5. The display of the claim 1 wherein said supports are cantilever beams, said cantilever beams are spaced from the shutter by a first gap and are spaced from the surface by a second gap.

6. The display of the claim 1 wherein said plurality of supports are attached at a first and a second end of the shutter and wherein said supports attached at said first end are substantially straight and the supports attached at said second end are curved.

7. The display of the claim 1 wherein said shutter includes a first and a second electrode and said supports provide an electrical connection from the surface to said first and second electrodes.

8. The display of the claim 1 wherein said shutter includes a flange extending from an edge of the shutter and forms an electrostatic actuator with a fixed electrode.

9. The display of the claim 1 wherein said shutter includes a flange extending from an edge of the shutter and forms an electrostatic actuator with a fixed electrode and wherein the electrostatic actuator applies a first force to the shutter and moves the shutter substantially in a lateral direction with respect to the first force.

10. The display of the claim 1 wherein each said modulator further includes an actuator that applies a first force to the shutter and moves the shutter substantially in a lateral direction with respect to the first force in a plane substantially parallel to the light absorbing layer.

11. The display of the claim 1 wherein said shutter includes a light blocking regions and said light transmitting regions of the light absorbing layer are larger than the light transmitting regions of the shutter and are smaller than the light blocking regions of the shutter.

12. The display of the claim 1 wherein each said modulator further includes electrodes that are formed on the light absorbing layer having a light reflecting surface facing the backlight.

13. The display of the claim 1 further includes a light diffuser layer for diffusing light transmitting through the light transmitting regions of the light absorbing layer.

14. A display comprising:
a light absorbing layer having a light transmitting regions, a backlight including a rear reflector for reflecting light towards the light absorbing layer and a plurality of modulators each including a shutter positioned between the backlight and the light absorbing layer, said shutter having light transmitting regions and a light reflecting surface facing the backlight for recycling the light emitted from the backlight, wherein said shutter supported over a surface with a plurality of supports that are located between the shutter and the surface and are spaced from the shutter by a first gap and are spaced from the surface by a second gap.

15. The display of the claim 14 wherein said supports are cantilever beams.

16. The display of the claim 14 wherein each said modulator further includes an actuator that applies a first force to the shutter and moves the shutter substantially in a lateral direction with respect to the first force in a plane substantially parallel to the light absorbing layer.

17. The display of the claim 14 wherein said plurality of supports are attached at a first and a second end of the shutter and wherein said supports attached at said first end are substantially straight and the supports attached at said second end are curved.

18. The display of the claim 14 wherein said shutter includes a flange extending from an edge of the shutter and forms an electrostatic actuator with a fixed electrode.

19. The display of the claim 14 wherein said shutter includes a flange extending from an edge of the shutter and forms an electrostatic actuator with a fixed electrode and wherein the electrostatic actuator applies a first force to the shutter and moves the shutter substantially in a lateral direction with respect to the first force.

20. The display of the claim 14 further includes a light diffuser layer for diffusing light transmitting through the light transmitting regions of the light absorbing layer.

* * * * *